United States Patent
Campbell et al.

(10) Patent No.: US 10,449,581 B2
(45) Date of Patent: Oct. 22, 2019

(54) SYSTEM AND METHOD FOR AN ELECTRODE SEAL ASSEMBLY

(71) Applicant: Kurion, Inc., Irvine, CA (US)

(72) Inventors: Brett Campbell, Richland, WA (US); Craig Shearer, Moses Lake, WA (US); Kevin Finucane, Richland, WA (US); Steve Woosley, Pasco, WA (US); Eric Dysland, Pasco, WA (US)

(73) Assignee: Kurion, Inc., Irvine, CA (US)

( * ) Notice: Subject to any disclaimer, the term of this patent is extended or adjusted under 35 U.S.C. 154(b) by 403 days.

(21) Appl. No.: 15/388,299

(22) Filed: Dec. 22, 2016

(65) Prior Publication Data

US 2017/0182530 A1     Jun. 29, 2017

Related U.S. Application Data

(60) Provisional application No. 62/272,604, filed on Dec. 29, 2015.

(51) Int. Cl.
*H05B 7/12* (2006.01)
*B09B 3/00* (2006.01)
(Continued)

(52) U.S. Cl.
CPC .............. *B09B 3/0025* (2013.01); *B09B 3/00* (2013.01); *B09B 3/0083* (2013.01); *C03B 5/005* (2013.01);
(Continued)

(58) Field of Classification Search
CPC ....... B09B 3/00; B09B 3/0025; B09B 3/0083; H05B 7/101; H05B 7/103; H05B 7/12;
(Continued)

(56) References Cited

U.S. PATENT DOCUMENTS 3,835,233 A * 9/1974 Prenn ...................... H05B 7/12
                                                           373/95
4,295,001 A     10/1981 Britton
(Continued)

FOREIGN PATENT DOCUMENTS

DE       10114335      8/2002
EP        1582699      10/2005
(Continued)

*Primary Examiner* — Hung D Nguyen
(74) *Attorney, Agent, or Firm* — Michael Best & Friedrich LLP

(57) ABSTRACT

A sealing system for isolating the environment inside a vitrification container from the outside environment comprises a vitrification container with a lid. The lid comprises two or more electrode seal assemblies through which two or more electrodes may be operatively positioned and extend down through the lid into the vitrification container. The electrodes may move axially up and down through the electrode seal assemblies or lock into place. The electrode seal assemblies each comprise a housing having two halves with recessed ring grooves. Sealing rings with a split may be placed into the grooves. Gas galleries may be machined or cast into the housing such that they are adjacent to the ring grooves. The gas galleries distribute gas onto the external faces of the sealing rings causing a change in pressure resulting in the sealing rings compressing onto the electrodes and forming a seal.

20 Claims, 27 Drawing Sheets

(51) Int. Cl.
*C03B 5/027* (2006.01)
*C03B 5/00* (2006.01)
*F27B 3/08* (2006.01)
*F27D 11/10* (2006.01)
*F27D 21/00* (2006.01)
*F27D 99/00* (2010.01)
*F27D 21/02* (2006.01)

(52) U.S. Cl.
CPC .............. *C03B 5/027* (2013.01); *F27B 3/085* (2013.01); *F27D 11/10* (2013.01); *F27D 21/0014* (2013.01); *F27D 99/0073* (2013.01); *H05B 7/12* (2013.01); *F27D 2021/026* (2013.01)

(58) Field of Classification Search
CPC ......... C03B 5/005; C03B 5/027; F27B 3/085; F27B 3/10; F27D 11/10; F27D 21/0014; F27D 99/0073; F27D 2021/026
USPC ........ 373/69, 71, 73, 79, 88, 94, 95, 96, 97, 373/100, 41
See application file for complete search history.

(56) References Cited

U.S. PATENT DOCUMENTS

| | | |
|---|---|---|
| 5,678,237 A | 10/1997 | Powell et al. |
| 6,283,908 B1 | 9/2001 | Powell et al. |
| 6,377,605 B1 * | 4/2002 | McCaffrey ............ H05B 7/101 373/95 |
| 6,558,308 B2 | 5/2003 | Powell et al. |
| 6,941,878 B2 | 9/2005 | Powell et al. |
| 7,211,038 B2 | 5/2007 | Thompson et al. |
| 7,429,239 B2 | 9/2008 | Thompson et al. |
| 8,960,679 B2 * | 2/2015 | Ollila ...................... H05B 7/12 373/95 |
| 2008/0167175 A1 | 7/2008 | Lowery et al. |
| 2008/0192795 A1 * | 8/2008 | Ronnberg ............... F27D 1/141 373/94 |
| 2014/0356270 A1 | 12/2014 | Shmayda et al. |
| 2015/0368136 A1 | 12/2015 | Raymont et al. |
| 2016/0225475 A1 | 8/2016 | Campbell et al. |

FOREIGN PATENT DOCUMENTS

| | | |
|---|---|---|
| JP | H09 279226 | 10/1997 |
| WO | 2011/015712 | 5/2007 |

\* cited by examiner

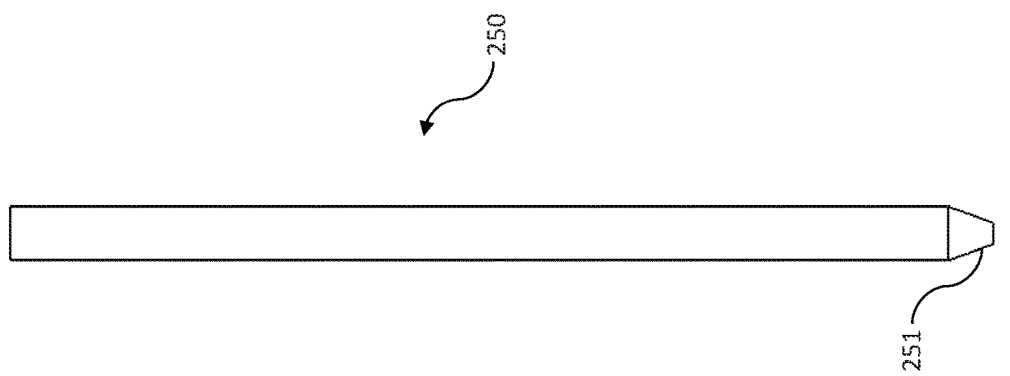

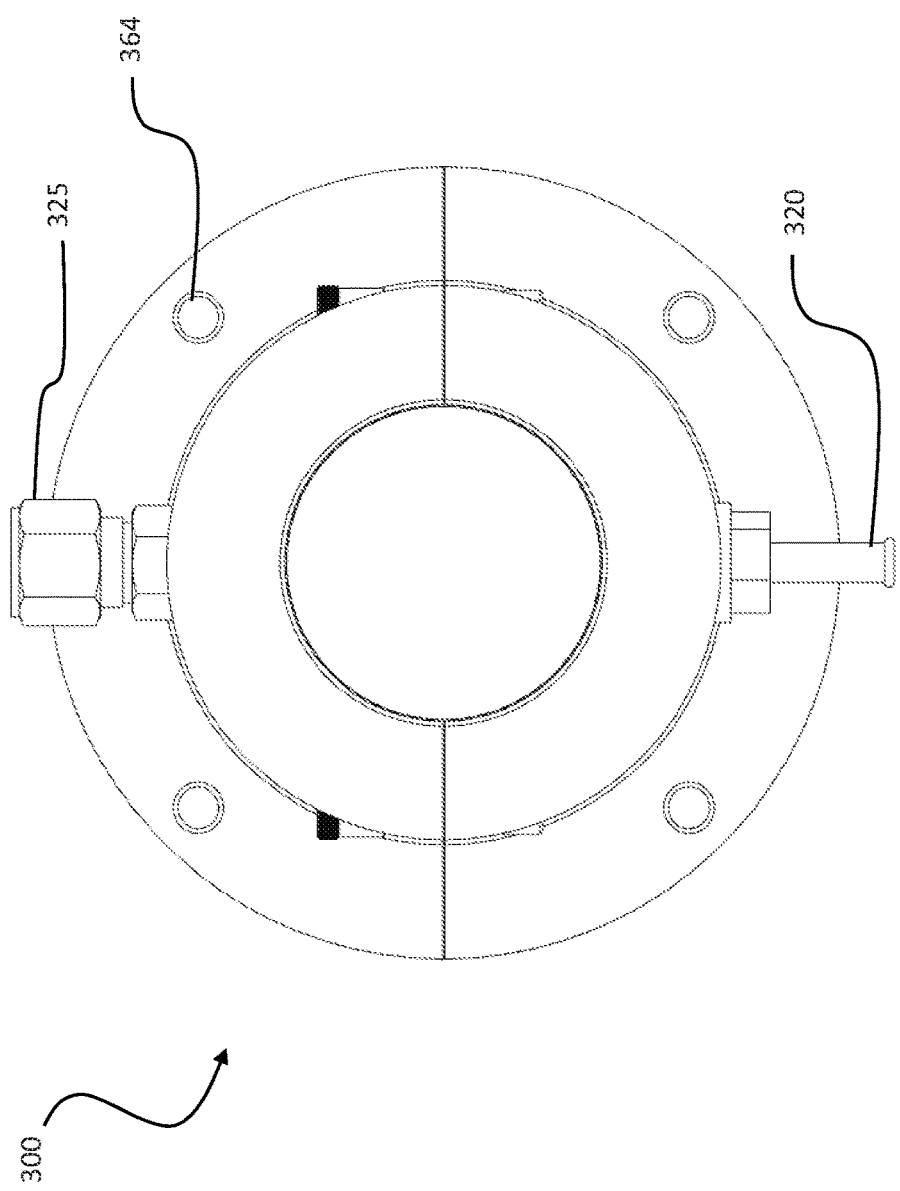

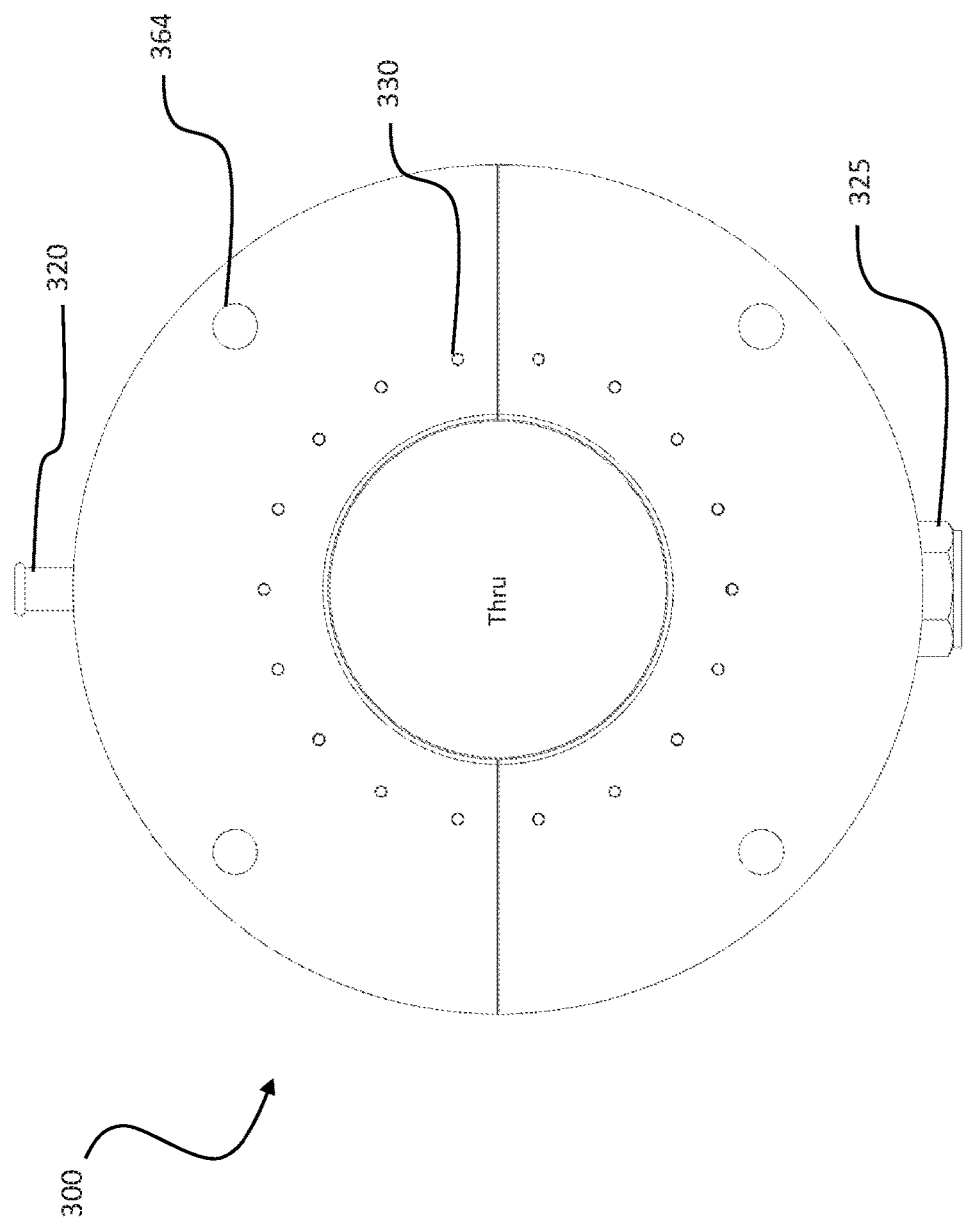

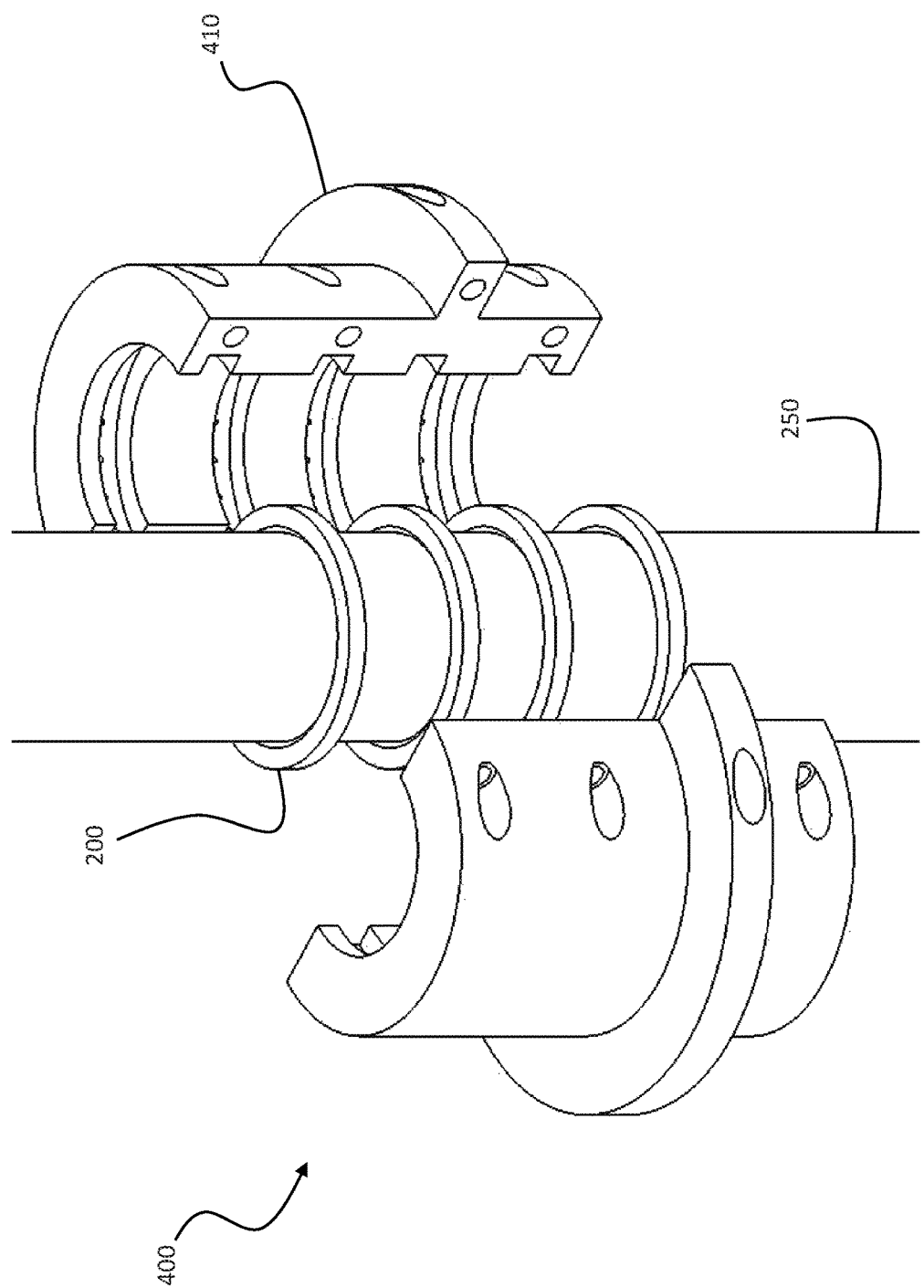

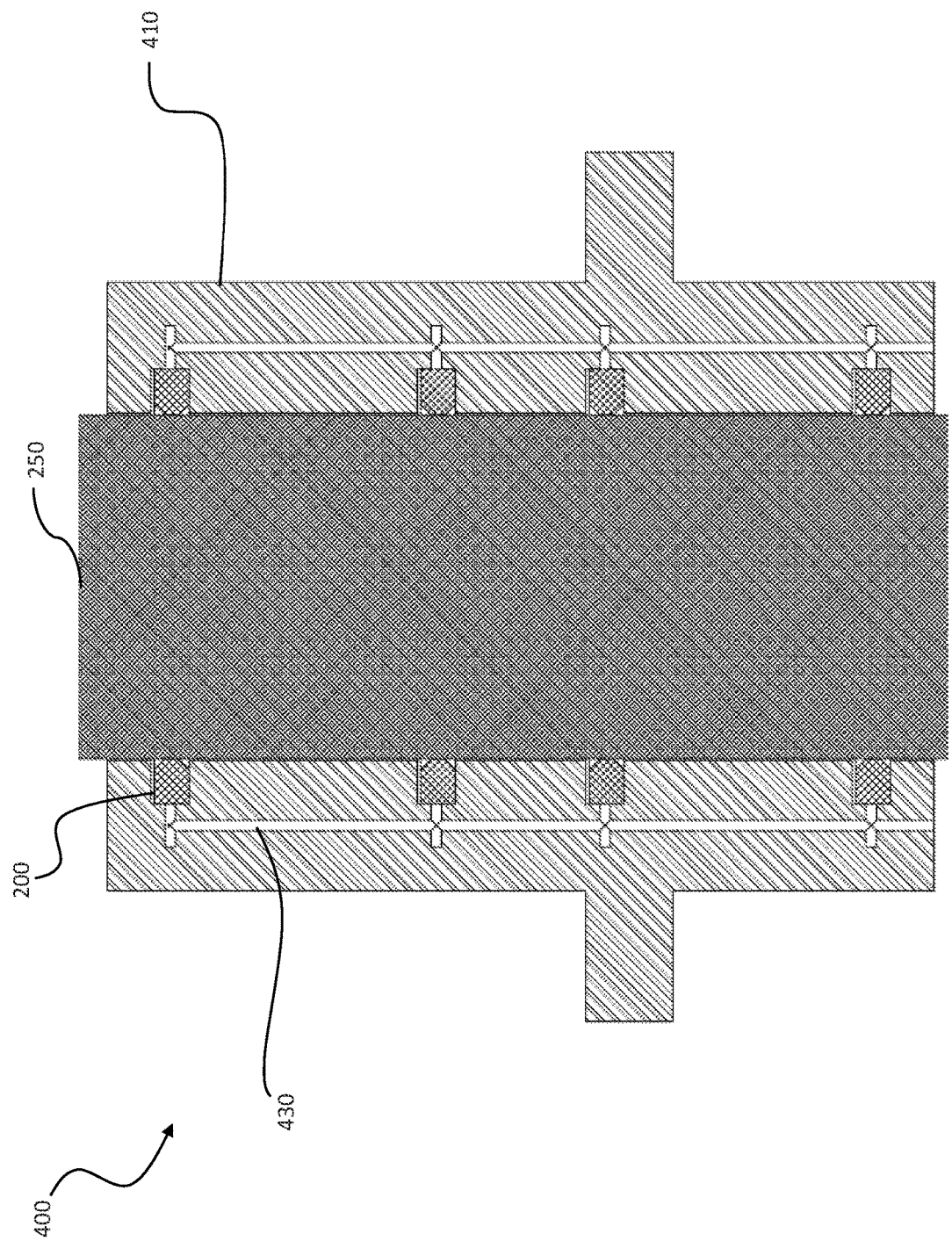

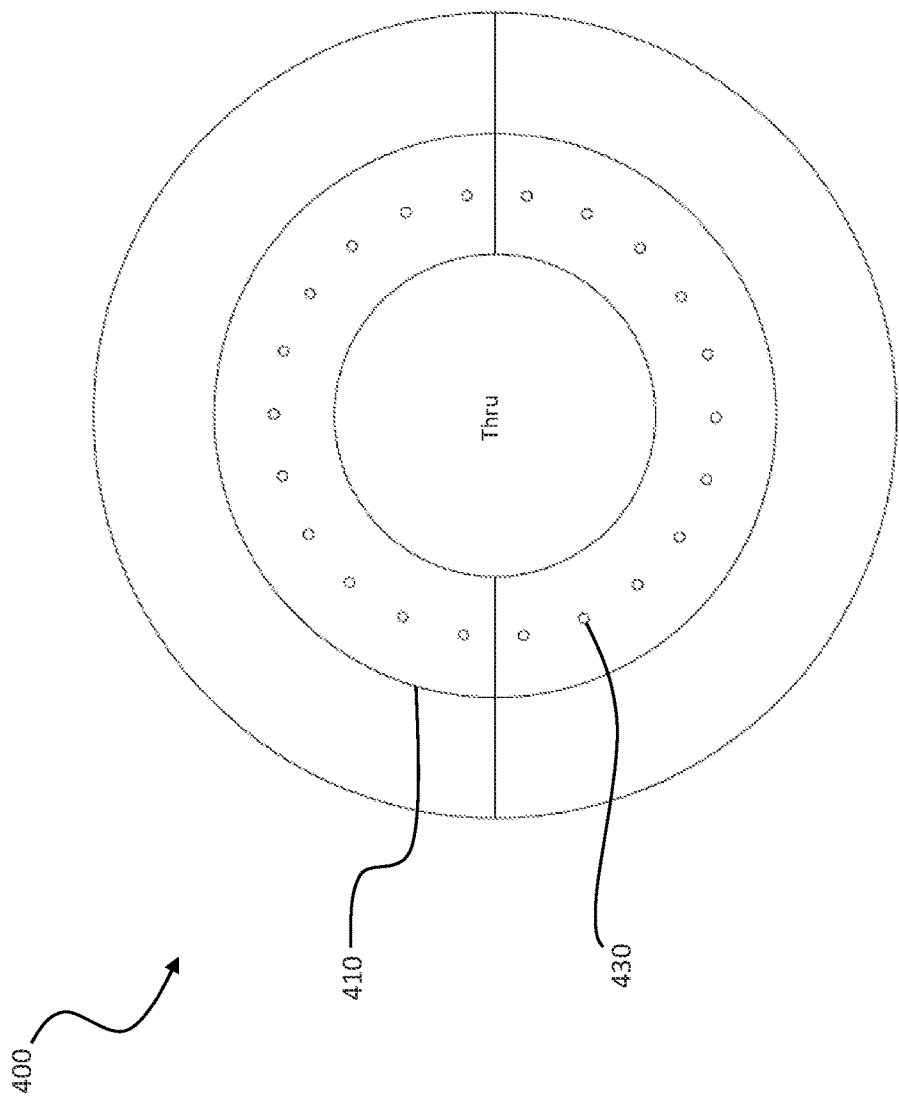

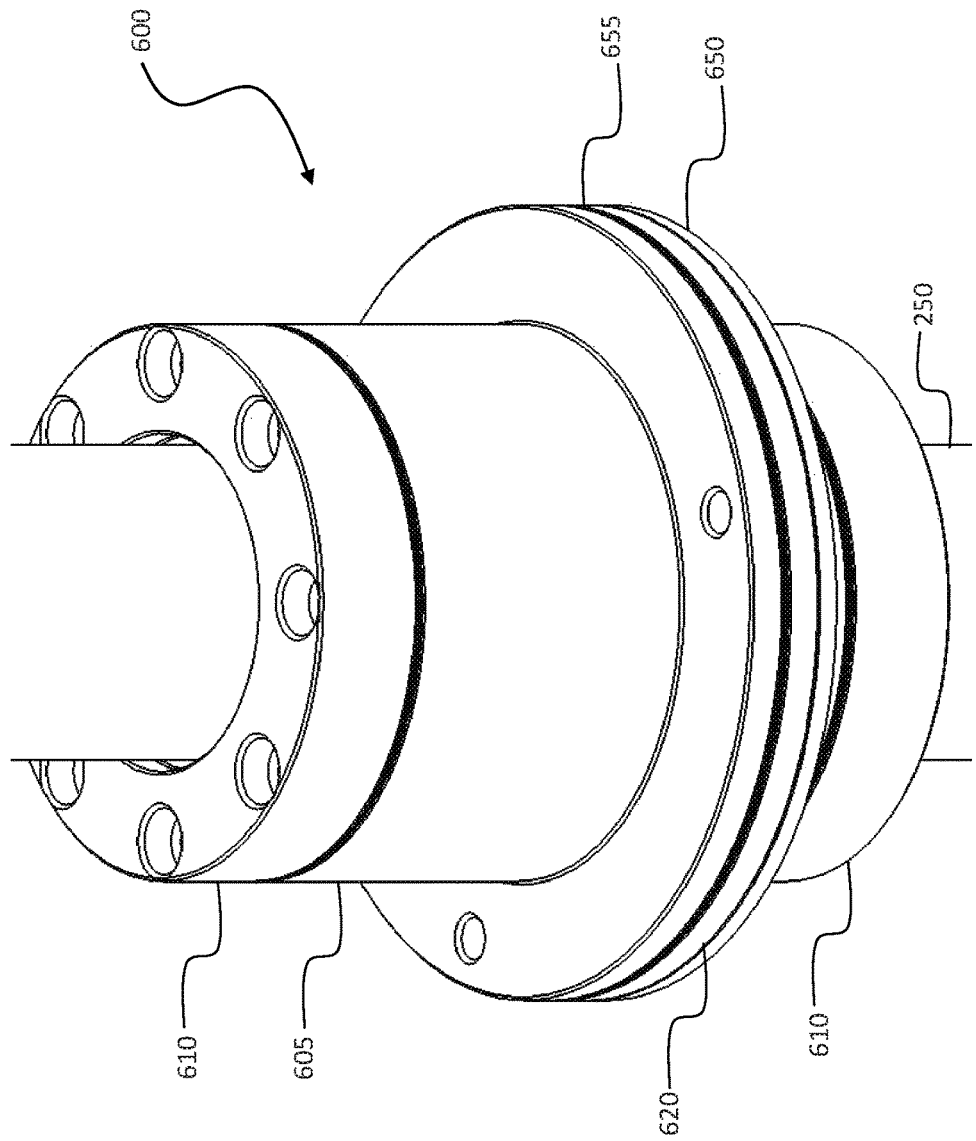

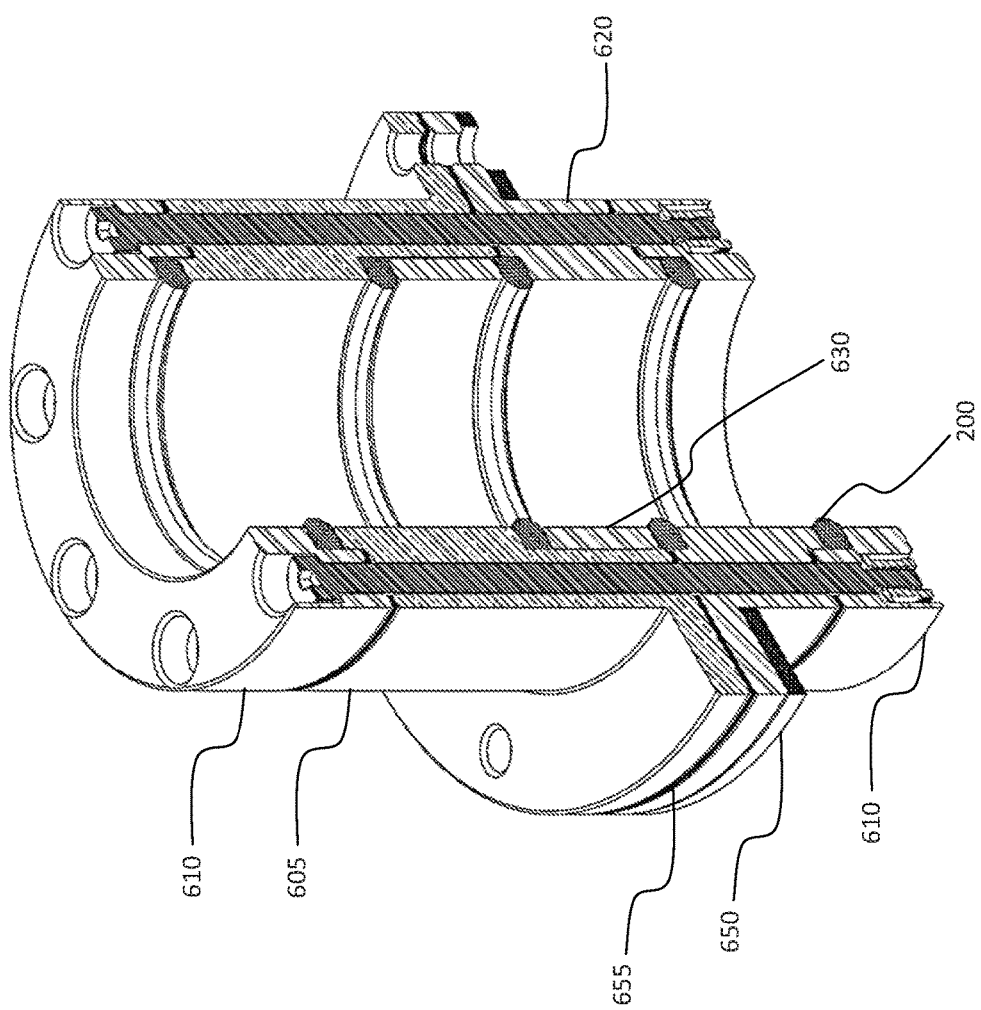

SYSTEM AND METHOD FOR AN ELECTRODE SEAL ASSEMBLY

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto and All Rights Reserved.

TECHNICAL FIELD

This disclosure relates generally to electrode seals and electrode seal assemblies for high temperature vitrification containers.

BACKGROUND

Vitrification methods involve the heating of waste material to be treated and a starter path which may comprise one or more conductive materials (e.g. glass frit, graphite flake, silica, cullet) in a vitrification chamber. The heating is effected by supplying current to the vitrification container with the use of axially inserted electrodes for the purpose of increasing the temperature of a starter path to the point where the adjacent material to be treated begins to melt. Once the heating is initiated and melting of the material begins, the molten material itself becomes conductive and can continue current conduction and heating. Application of power to the electrodes can continue until the material contained in the vitrification chamber is completely melted. Electrodes are typically consumed by the melt in the vitrification container.

Gases may escape from the vitrification container between the electrode and the lid and/or if the vitrification container is operated at negative pressure cold air may be drawn in. Inability to maintain the atmosphere within the vitrification container leads to loss of heat, a reduction in efficiency, and a potential loss of containment of gases in the hood. The outer surface of the electrodes may be subject to erosion through oxidation caused by hot gases within the vitrification container and heating of the electrodes which can reduce the current carrying capacity of the electrodes. It is desirable to avoid leakage of gases from the vitrification container as they can be harmful to the environment, workers, and equipment.

There is a need for electrode seal assemblies which are capable of at least one of effecting seals under conditions of both positive and negative pressures in the vitrification container, maintaining the environment in the vitrification container, allowing for axial movement of the electrodes, and preventing gases from being released. In some embodiments of electrode seal assemblies disclosed herein a seal is effected using gas pressure resulting in pressure gradients greater than the pressure in the vitrification container.

So as to reduce the complexity and length of the Detailed Specification, Applicant(s) herein expressly incorporate(s) by reference all of the following materials identified in each paragraph below. The incorporated materials are not necessarily "prior art" and Applicant(s) expressly reserve(s) the right to swear behind any of the incorporated materials.

Advanced Tritium System and Advanced Permeation System for Separation of Tritium from Radioactive Wastes and Reactor Water in Light Water Systems, Ser. No. 62/239,660 filed Oct. 9, 2015, which is herein incorporated by reference in its entirety.

GeoMelt Electrode Seal, Ser. No. 62/272,604 filed Dec. 29, 2015, which is herein incorporated by reference in its entirety.

Ion Specific Media Removal from Vessel for Vitrification, Ser. No. 15/012,101 filed Feb. 1, 2016, with a priority date of Feb. 1, 2015, which is herein incorporated by reference in its entirety.

Mobile Processing System for Hazardous and Radioactive Isotope Removal, Ser. No. 14/748,535 filed Jun. 24, 2015, with a priority date of Jun. 24, 2014, which is herein incorporated by reference in its entirety.

Balanced Closed Loop Continuous Extraction Process for Hydrogen Isotopes, Ser. No. 14/294,033, filed Jun. 2, 2014, with a priority date of May 31, 2013, which is herein incorporated by reference in its entirety.

Methods for Melting of Materials to be Treated, U.S. Pat. No. 7,211,038 filed Mar. 25, 2001, with a priority date of Sep. 25, 2001, which is herein incorporated by reference in its entirety.

Methods for Melting of Materials to be Treated, U.S. Pat. No. 7,429,239 filed Apr. 27, 2007, with a priority date of Sep. 25, 2001, which is herein incorporated by reference in its entirety.

In-Situ Vitrification of Waste Materials, U.S. Pat. No. 5,678,237 filed Jun. 24, 1996, with a priority date of Jun. 24, 1996, which is herein incorporated by reference in its entirety.

Vitrification of Waste with Continuous Filling and Sequential Melting, U.S. Pat. No. 6,283,908 filed May 4, 2000, with a priority date of May 4, 2000, which is herein incorporated by reference in its entirety.

AVS Melting Process, U.S. Pat. No. 6,558,308 filed Apr. 25, 2002, with a priority date of May 7, 2001, which is herein incorporated by reference in its entirety.

Advanced Vitrification System 2, U.S. Pat. No. 6,941,878 filed Sep. 26, 2003, with a priority date of Sep. 27, 2002, which is herein incorporated by reference in its entirety.

Applicant(s) believe(s) that the material incorporated above is "non-essential" in accordance with 37 CFR 1.57, because it is referred to for purposes of indicating the background or illustrating the state of the art. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

Aspects and applications presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the systems, methods, processes, and/or apparatuses disclosed herein. To the contrary, if the provisions of 35 U.S.C. § 112, ¶6 are sought to be invoked to define the embodiments, the claims will specifically and expressly state the exact phrases "means for" or "step for, and will also recite the word "function" (i.e., will state "means for performing the function of . . . "), without also reciting in such phrases any structure, material or act in support of the function. Thus, even when the claims recite a "means for performing the function of . . . " or "step for performing the function of . . . ", if the claims also recite any structure, material or acts in support of that means or step, or that perform the recited function, then it is the clear intention of the inventors not to invoke the provisions of 35 U.S.C. § 112, ¶6. Moreover, even if the provisions of 35 U.S.C. § 112, ¶6 are invoked to define the claimed embodiments, it is intended that the embodiments not be limited only to the specific structure, material or acts that are described in the preferred embodiments, but in addition, include any and all structures, materials or acts that perform the claimed function as described in alternative embodiments or forms, or that are well known present or later-developed, equivalent structures, material or acts for performing the claimed function.

BRIEF DESCRIPTION OF THE FIGURES

A more complete understanding of the systems, methods, processes, and/or apparatuses disclosed herein may be derived by referring to the detailed description when considered in connection with the following illustrative figures. In the figures, like-reference numbers refer to like-elements or acts throughout the figures. The presently preferred embodiments are illustrated in the accompanying drawings, in which:

FIG. 2 is an illustration of an electrode.

FIG. 4B is a top view of the electrode seal assembly embodiment of FIG. 4A.

FIG. 4D is a bottom view of the electrode seal assembly embodiment of FIG. 4A.

FIG. 5B depicts an exploded isometric view of the electrode seal assembly embodiment of FIG. 5A.

FIG. 5C depicts a cross section of the electrode seal assembly embodiment of FIG. 5A.

FIG. 5E depicts a bottom view of the electrode seal assembly embodiment of FIG. 5A.

FIG. 7A is an isometric view of an embodiment of an electrode seal assembly.

FIG. 7D is an isometric cross-section the electrode seal assembly embodiment of FIG. 7A.

Elements and acts in the figures are illustrated for simplicity and have not necessarily been rendered according to any particular sequence or embodiment.

DETAILED DESCRIPTION

In the following description, and for the purposes of explanation, numerous specific details, process durations, and/or specific formula values are set forth in order to provide a thorough understanding of the various aspects of exemplary embodiments. It will be understood, however, by those skilled in the relevant arts, that the apparatus, systems, and methods herein may be practiced without these specific details, process durations, and/or specific formula values. It is to be understood that other embodiments may be utilized and structural and functional changes may be made without departing from the scope of the apparatus, systems, and methods herein. In other instances, known structures and devices are shown or discussed more generally in order to avoid obscuring the exemplary embodiments. In many cases, a description of the operation is sufficient to enable one to implement the various forms, particularly when the operation is to be implemented in software. It should be noted that there are many different and alternative configurations, devices, and technologies to which the disclosed embodiments may be applied. The full scope of the embodiments is not limited to the examples that are described below.

In the following examples of the illustrated embodiments, references are made to the accompanying drawings which form a part hereof, and in which is shown by way of illustration various embodiments in which the systems, methods, processes, and/or apparatuses disclosed herein may be practiced. It is to be understood that other embodiments may be utilized and structural and functional changes may be made without departing from the scope.

Process Overview

Figure 1:
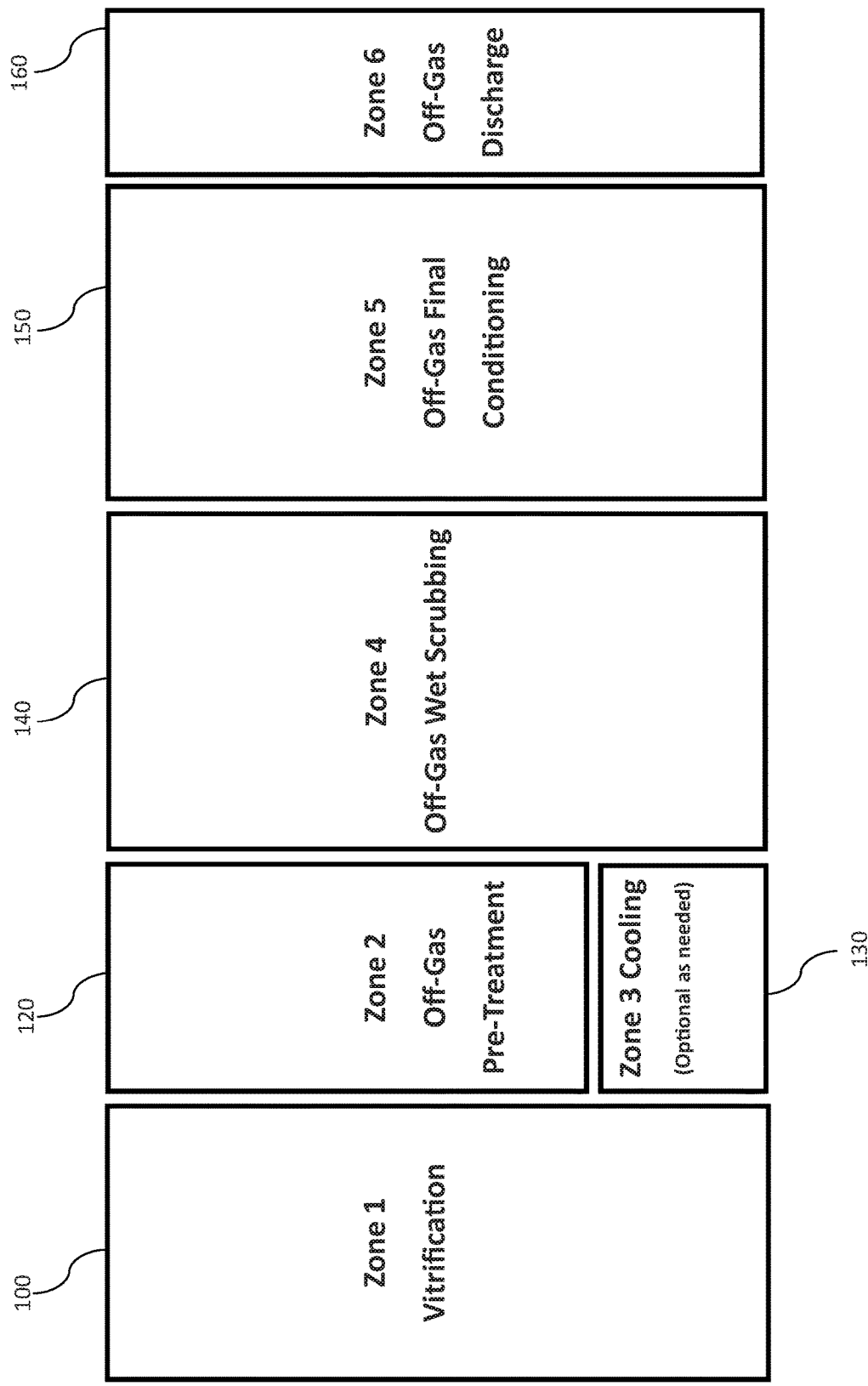
FIG. 1 is a block diagram showing the primary components in a typical vitrification system.

FIG. 1 depicts different stages in an embodiment of a vitrification process which include: the vitrification 100 (Zone 1), off-gas pre-treatment 120 (Zone 2), cooling (optional as needed) 130 (Zone 3), off-gas wet scrubbing 140 (Zone 4), off-gas final conditioning 150 (Zone 5), and off-gas discharge 160 (Zone 6). Other embodiments may utilize different zones and processes. Vitrification is used to destroy or immobilize hazardous waste by exposure to high temperatures that results in the contaminants being eliminated or entrained within a glass matrix. The process reduces or eliminates pre-treatment requirements, increases waste load capacity, and reduces maintenance costs as compared to other hazardous waste processing and storage methods. Some hazardous waste processing and storage methods are only suitable for a single waste type or classification whereas vitrification can be applied to a wider range of hazardous materials. Vitrified glass has a high waste loading capacity and is considered stable.

In some embodiments the vitrification process used is in-container vitrification (ICV™) In-container vitrification (ICV™) treatment is similar to conventional vitrification methods. It differs in that the entire vitrification process and subsequent storage of the vitrification process product occurs within the same container thus reducing equipment and steps required in final processing. The container used in the vitrification process may be a sealed electric arc furnace, joule heated melter, or other type of sealed furnace or melter. The system in which the vitrification container is used is referred to herein as the vitrification containment system (VCS). The VCS comprises a vitrification container, at least one electrode, and a lid for sealing the top of the vitrification container. The lid, or hood, comprises one or more lead-throughs, hereinafter referred to as electrode seal assemblies, through which the one or more electrodes are fed into the vitrification container. The electrode seal assemblies may provide at least one of thermal and electrical insulation for the electrodes, in some embodiments. The electrode seal assemblies may provide pressure and gas/air flow isolation for the electrode from the hood environment, in some embodiments. The electrode seal assemblies may provide an atmospheric seal while under differential pressure conditions, in some embodiments.

Continuing with an embodiment description of FIG. 1, off-gases from the vitrification process may be pre-treated in an Off-Gas Pre-Treatment process 120 (Zone 2). A Cooling process 130 (Zone 3) is an optional step that may be used in cases where the temperature of the off-gas may need to be lowered. The off-gases may contain substances considered harmful to the environment. Off-Gas Wet Scrubbing 140 (Zone 4) may utilize a wet-scrubber to decontaminate the off-gas, flue gas, or other gases containing various pollutants. After the Off-Gas Wet Scrubbing process 140, the off-gas may proceed to further conditioning in the Off-Gas Final Conditioning process 150 (Zone 5) based on the output requirements, including to meet environmental release requirements. This may include moisture removal, further treatment of remaining impurities or particles, etc. Once the treatment is complete, the off-gas can be released via the Off-Gas Discharge 160 (Zone 6). The off-gas may either be released to the environment if it meets regulations, reused as waste heat in the process or a separate process, or it may be discharged for further processing.

Terminology

Vitrification Container—The vitrification container may refer to a container in which the electrode(s) are inserted and the vitrification takes place. In some embodiments, electrode seal assemblies are coupled to the lid of the vitrification container to facilitate insertion of the electrode(s).

Electrode—An electrode may refer to an electrical conductor used to make contact with a nonmetallic part of a circuit. The electrode(s) conduct energy within the vitrification container to facilitate vitrification of the materials within. An embodiment of an electrode is depicted in FIG. 2. Electrodes are typically generic to various embodiments of electrode seal assembly designs.

Electrode Seal Assembly (also referred to as Seal Assembly or Lead-Through)—Electrode seal assembly may refer to a complete assembly comprising the electrode seal housing, sealing ring(s), and any other fasteners and gaskets that form each embodiment. Electrode seal assemblies for high temperature vitrification containers have a primary purpose of preventing gases from escaping the treatment vessel and a secondary purpose of providing guides for electrode insertion into the melting environment. Any one or more components forming any embodiment of an electrode seal assembly may have one or more chamfered edges to facilitate insertion of an electrode and to minimize potential for shavings to shear off the electrode.

Seal Housing—The term seal housing may refer to the one or more primary structural components of an electrode seal assembly. The seal housing serves to contain the sealing rings and to couple to the vitrification container lid as insulation between the electrode(s) and other conducting components.

Figure 3B:
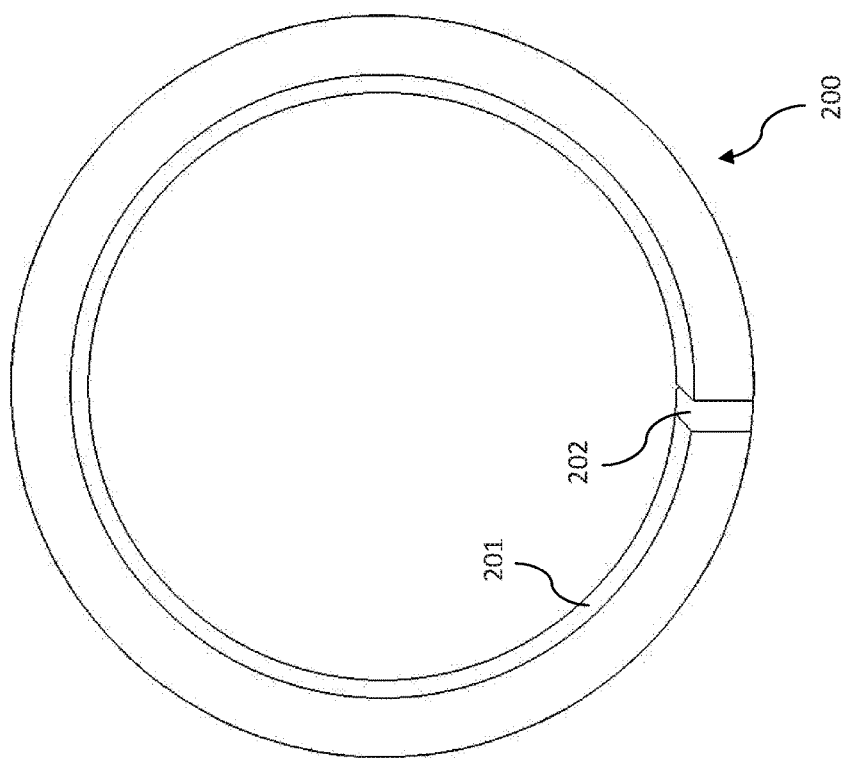
FIG. 3B is a top view of the electrode seal embodiment of FIG. 3A.
Figure 3A:
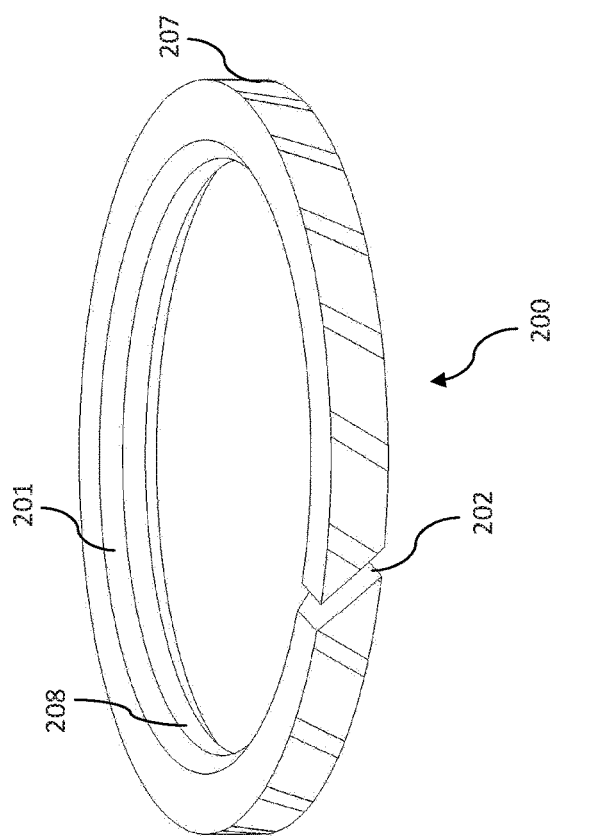
FIG. 3A is an isometric view of an embodiment of an electrode seal.
Figure 3C:
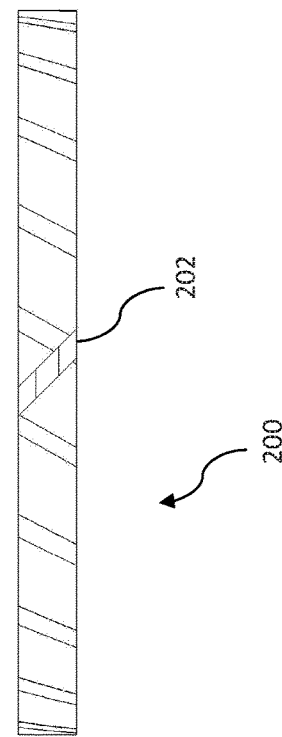
FIG. 3C is a front view of the electrode seal embodiment of FIG. 3A.

Electrode Seal also referred to as Graphite Seal, Sealing Ring, or Seal—The terms may refer to the individual sealing rings and not to an entire electrode seal assembly. An embodiment of a sealing ring is depicted in FIGS. 3A through 3C. The depicted sealing ring is used throughout the depicted electrode seal assembly embodiments; however other sealing ring embodiments may be utilized. In some embodiments the sealing ring may contain at least 95% carbon content.

Sealing Section—Sealing sections may refer to separate areas within a seal housing in which one or more sealing rings reside. Each sealing section may comprise one or more sealing rings. Each seal housing may comprise one or more sealing sections. The need for a sealing section embodiment is further described later in the disclosure.

Electrodes and Seals

FIG. 2 depicts an embodiment of an electrode 250. The length of the electrode 250 is generally greater than the diameter. In some embodiments, one end of the electrode 250 is tapered 251. The tapered end 251 facilitates alignment of the electrode 250 during insertion into an electrode seal assembly and vitrification container. One or more electrodes 250 may be inserted into an electrode seal assembly and fed into the vitrification container as the melt deepens, maintaining the end of the electrodes 251 at or near the bottom of the melt area. This requires a portion of the electrodes 250 to be extended above the vitrification container at the early stages in the melt process.

Long electrodes 250 are more likely to break due to increased moment arm; therefore the electrodes 250 in some embodiments may be threaded to allow shorter sections to be added incrementally. Typically, smaller electrodes 250 may be male/female and larger electrodes 250 may be female/female and attached with a double threaded male nipple. On the electrodes 250, the male ends are typically fully threaded but the female ends can only be threaded to a minimum shell thickness. At the joint between smaller diameter male/female electrode 250 segments there is often a gap that is created by the threads.

Graphite electrodes are commonly used in electric arc furnaces due to their excellent electrical and thermal conductivity, high temperature strength, and low thermal expansion. Graphite is the preferred electrode material; however, other materials are considered including both consumable and non-consumable electrode materials. While graphite electrodes are commonly used for vitrification, there are some aspects that can be problematic. A common problem with graphite electrodes 250 are small shavings that occasionally shear off of the electrodes 250 onto the top of the electrode seal assembly and vitrification chamber. These shavings may cause electric arc potential, with an embodiment solution described later in this disclosure. Electrodes 250 may be conductive, heat resistant, and corrosion resistant.

FIGS. 3A through 3C depict different views of an embodiment of an electrode seal 200, also referred to as "seal", "sealing ring", or "graphite seal". The terms may refer to individual sealing rings and not to an entire electrode seal assembly. Each electrode seal assembly may comprise one or more sealing rings. Sealing rings are typically generic to various embodiments of electrode seal assembly. In some embodiments the one or more sealing rings 200 may be composed of graphite. Graphite sealing rings 200 may be preferred due to graphite being heat resistant, oxidation resistant, wear resistant, and having a low coefficient of friction; however, other materials may be used. In embodiments utilizing more than one sealing ring 200, each sealing ring 200 may be composed of different materials or they may all be composed of the same material.

In some embodiments the sealing rings 200 may be wrapped in a material that, when subjected to heat and pressure, forms a thick, stable, and passivating oxide layer which protects the surface of the sealing ring 200 from degradation. In some embodiments the sealing rings 200 are wrapped with a material that is austenite nickel-chromium based. In some embodiments one or more of the sealing rings 200 may be Inconel wrapped. In some embodiments the Inconel is spiral wrapped around the outer circumference of the sealing ring 200. Inconel increases resistance to corrosion at high temperatures as well as rigidity. The sealing rings 200 in some embodiments may be composed of a material that is rated for service in extreme environments including extreme heat and pressure (e.g. graphite). In some embodiments utilizing more than one sealing ring 200, one or more of the sealing rings 200 may be Inconel wrapped.

In some embodiments, the aforementioned gap that may be present between rod sections may be able to pass through the seal assembly without losing the seal on the electrode, i.e. at least one sealing ring 200 or sealing section should be fully engaged around the electrode at any given time. For instance, if there are two sealing sections, the electrode gap should be able to pass through one sealing section while the other is still fully engaged. The more sealing sections, the higher the factor of safety.

The sealing rings 200 in some embodiments are manufactured with the inner ring edges chamfered 201 as shown in FIG. 3A; since the same force is applied on a smaller internal surface 208 area, the higher pressure results in an enhanced sealing effect. In some embodiments, the sealing rings 200 have a swept cut, or split, end 202 which allows them to contract and tighten around the electrode under induced pressure on the external surface 207. One or more of the sealing rings 200 may have one or both sides of the inner ring chamfered to facilitate motion of the rod down through the seal housing and to reduce the incidence of shavings shearing off the electrode. In some embodiments, only the top or the bottom edge of the sealing ring 200 internal surface 208 is chamfered.

Electrode Seal Assembly Embodiments

The following section discusses several electrode seal assembly embodiments. The order of presentation does not imply order of preference. It should be clear that while each embodiment is discussed as a separate whole from the other embodiments that various aspects from any one or more embodiments may be combined to form other embodiments not explicitly disclosed herein.

In some embodiments, sealing may be enhanced by a positive gas pressure curtain barrier and/or a plurality of mechanical seals. In some embodiments utilizing a pressure seal the air or inert gases used to effect the pressure seal may be one of heated or cooled depending on the material to be vitrified and other system variables. In some embodiments utilizing a pressure seal one or more sensors, regulators, and/or valves may be used to monitor and control flow in the seal assemblies. In some embodiments, gases escaping past the seals may be aspirated for recycling into the vitrification container.

In an example embodiment, a sealing system comprises two or more electrodes and a vitrification container. A lid is attached to the vitrification container to form a sealed vitrification container. Two or more electrodes are operatively positioned through the lid and extend down into the vitrification container. In this example embodiment, two or more electrode seal assemblies are affixed to the lid. The two or more electrode seal assemblies may provide at least one of thermal and electrical insulation for the two or more electrodes, in some embodiments. The two or more electrode seal assemblies may provide a way to isolate the environment external to the vitrification system from the conditions inside of the lid, or off-gas hood, while also allowing the electrodes to penetrate and be moved into and out of the vitrification zone. The two or more electrode seal assemblies each comprise a housing wherein the housing comprises of two halves and ring grooves recessed into the housing. Sealing rings with a split may be placed into the grooves wherein the placement results in external faces of the sealing rings being recessed into the ring grooves. The system also comprises gas galleries that may be machined or cast into the housing such that they are adjacent to the two or more ring grooves. The gas galleries distribute gas equally onto the external faces of the sealing rings from an interior face of the ring grooves. The distributed gas causes a change in pressure resulting in the sealing rings compressing onto the electrode and forming a seal.

FIGS. 4A through 4G depict an embodiment of an electrode seal assembly 300.

Figure 4A:
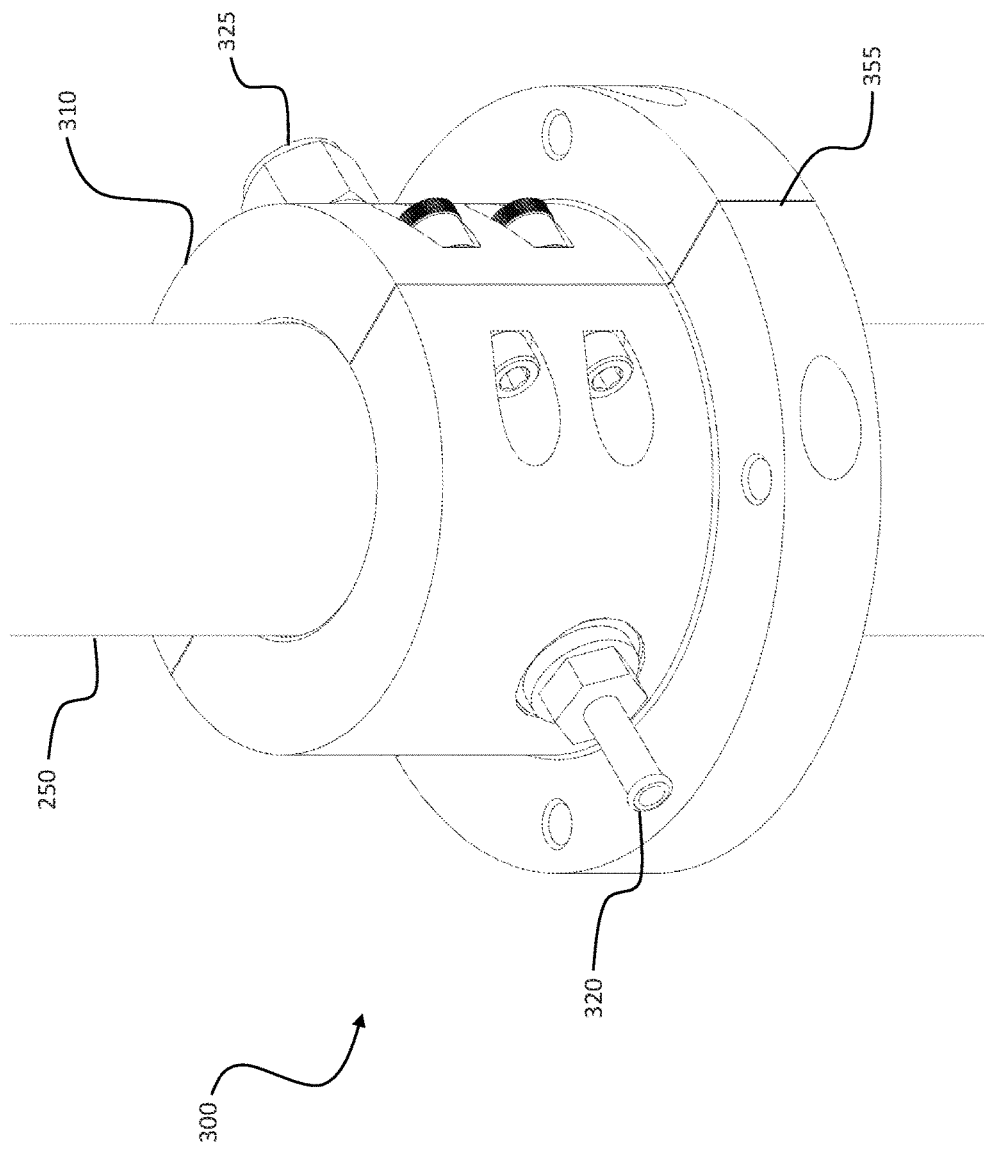
FIG. 4A is an isometric view of an embodiment of the seal assembly.

FIG. 4A depicts an isometric view of an embodiment of an electrode seal assembly 300. The electrode seal assembly 300 comprises a seal housing 310, housing gasket 350, two split gaskets 355, and one or more hose fittings 325 and 320 (FIG. 4B). In some embodiments, such as the one depicted in FIGS. 4A through 4G, the seal housing 310 is split into two halves in a "clamshell" design. In some embodiments, the seal housing 310 may be split into more sections. In some embodiments, the sections of the seal housing 310 are identical. The clamshell design of the seal housing 310 allows for easy maintenance and replacement. The sections of the seal housing 310 may be fastened with fasteners. Split gaskets (not shown) may be placed between each section of the seal housing 310. In some embodiments the split gaskets are composed of graphite, or other thermal and/or electric insulating materials, or combinations thereof. In some embodiments the split gaskets may be comprised of a rope seal material, high temperature fiber, or other material rated for high heat (above 500° C. in some embodiments) and that is capable of providing a seal to prevent leakage. In some embodiments one or more of the gaskets may be formed of graphite with a stainless steel inner core.

FIG. 4B depicts the top of the electrode seal assembly 300. The depicted bolt holes 364 may be used to secure the electrode seal assembly 300 to the top of the vitrification container. In the depicted embodiment there are four bolt holes 364, however the number of bolt holes 364 may vary dependent on a number of factors such as size of the electrode seal assembly 300 and fastener type and size, to name a few. The hose fittings 325 and 320 may be used to supply and release pressure around the seals using air or other inert gases.

Figure 4C:
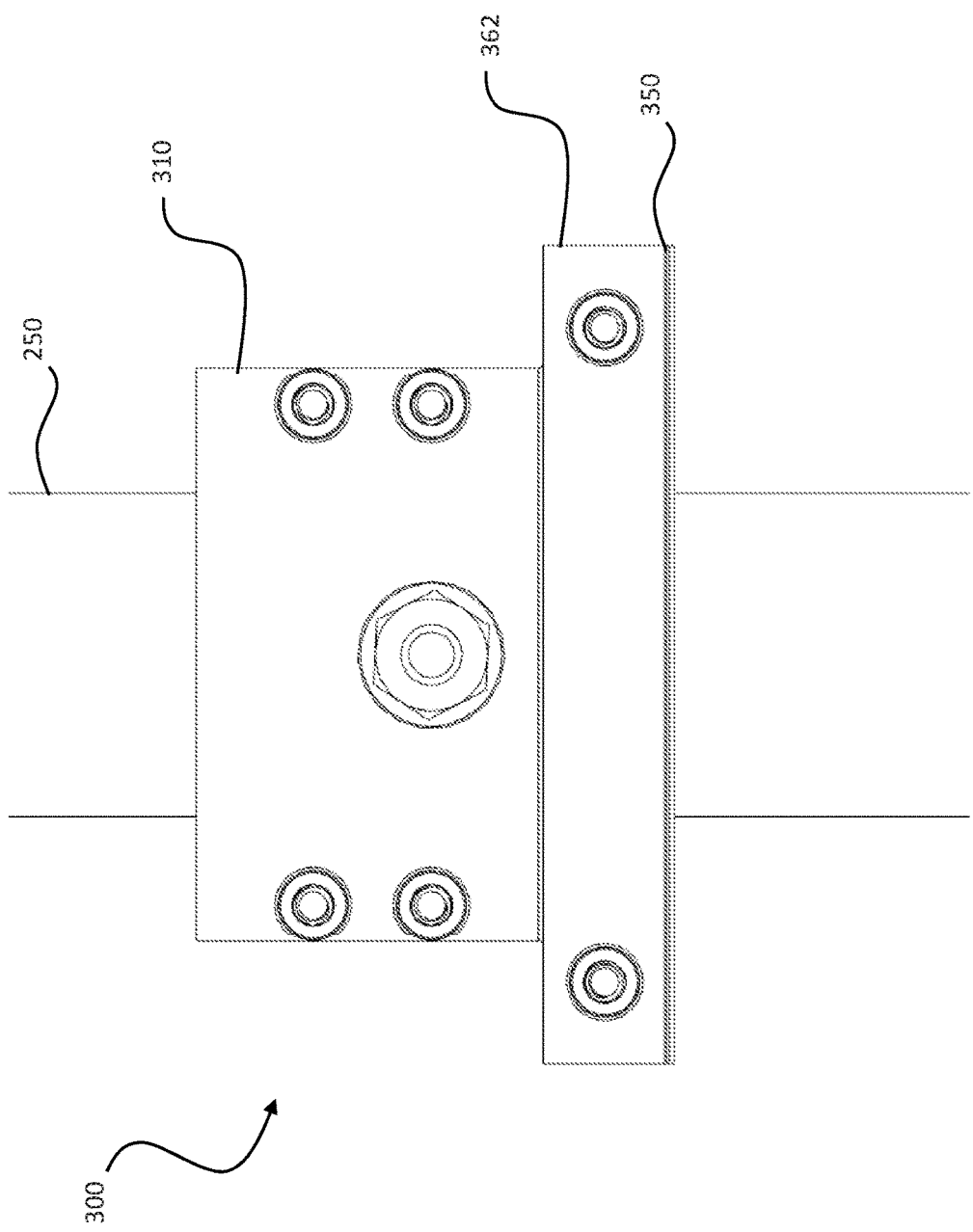
FIG. 4C is a front view of the electrode seal assembly embodiment of FIG. 4A.

FIG. 4C depicts a front view of the electrode seal assembly 300. In the depicted embodiment the electrode seal assembly 300 is comprised of two identical seal housings 310. The two seal housings 310 are fastened together using a number of fasteners, which may vary between embodiments. The electrode seal assembly 300 comprises a flange 362 which rests on the top of the vitrification container. The flange 362 provides holes 364 (FIG. 4D) through which the electrode seal assembly 300 may be mounted to the vitrification container. A housing gasket 350 may be positioned between the flange 362 and the vitrification container. The flange 362 of the seal housing 310 is fastened down to the top lid of a vitrification container. In some embodiments, the seal housing 310 may be comprised of ceramic, graphite, Macor™, CS-85, other thermal and/or electric insulating materials, or combinations thereof. Other seal housing material may be used. The housing gasket 350 may be comprised of graphite with a stainless steel inner core in some embodiments.

FIG. 4D depicts a bottom view of the electrode seal assembly 300. In the depicted embodiment, gas galleries 330 are drilled through the base of the electrode seal assembly 300. The depicted embodiment comprises eighteen evenly distributed vertical gas galleries 330; however other amounts and configurations are possible. Gas galleries 330 are shown and described in more detail in FIGS. 4F and 4G.

Figure 4E:
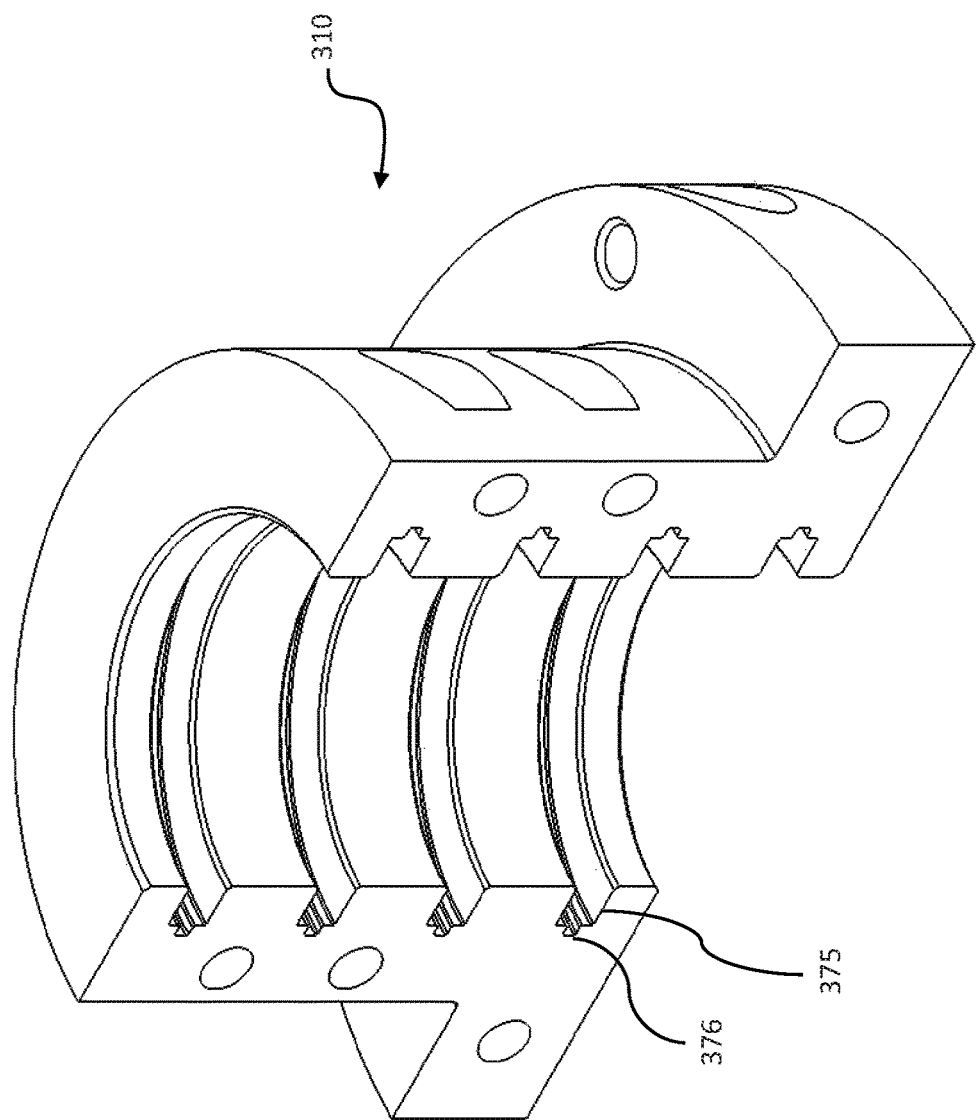
FIG. 4E is an isometric view of half of a clamshell style seal housing of the electrode seal assembly embodiment of FIG. 4A.

FIG. 4E depicts an isometric view of one half of the seal housing 310. The ring grooves 375 inside the seal housing 310 are designed to hold and secure the sealing rings 200 (FIG. 4F) in position. In the depicted embodiment there are four ring grooves 375 however other embodiments may comprise other amounts. In some embodiments one or more ring grooves 375 may be sized to accommodate more than one sealing ring 200. In some embodiments the ring grooves 375 comprise a pressure groove 376 which allows gas flow around the sealing rings 200 (FIG. 4F) to effect a pressure seal.

The depicted embodiment 300 uses pressurization to reinforce and tighten the sealing rings 200 around the electrode 250. Each sealing ring 200 is mounted in a ring groove 375 to secure it in place. In some embodiments, such as the one depicted in FIGS. 4F through 4G, one or more of the ring grooves 375 comprise a further pressurization groove 376 through which the pressurized air and or inert gases may act upon the sealing rings 200. Pressurization may be achieved by inputting air and/or inert gases into the seal housing 310. The pressure is supplied into the seal housing 310 through the hose fitting 325 and it is passed through the cavities or gas galleries 330 in each of the seal housing sections 310 to the sealing rings 200.

Figure 4F:
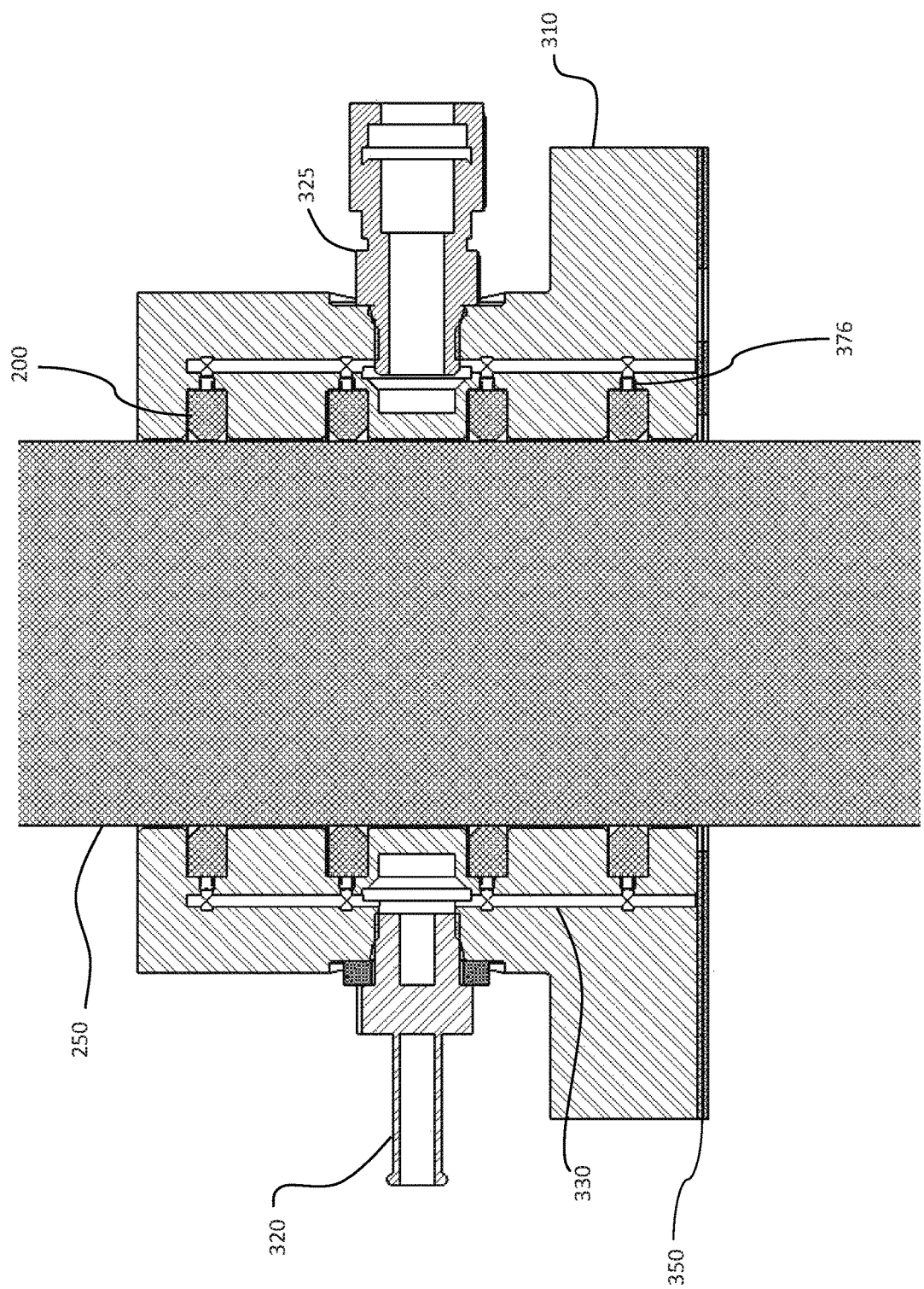
FIG. 4F is a cross section of the seal assembly detailing the interior components of the electrode seal assembly embodiment of FIG. 4A.
Figure 4G:
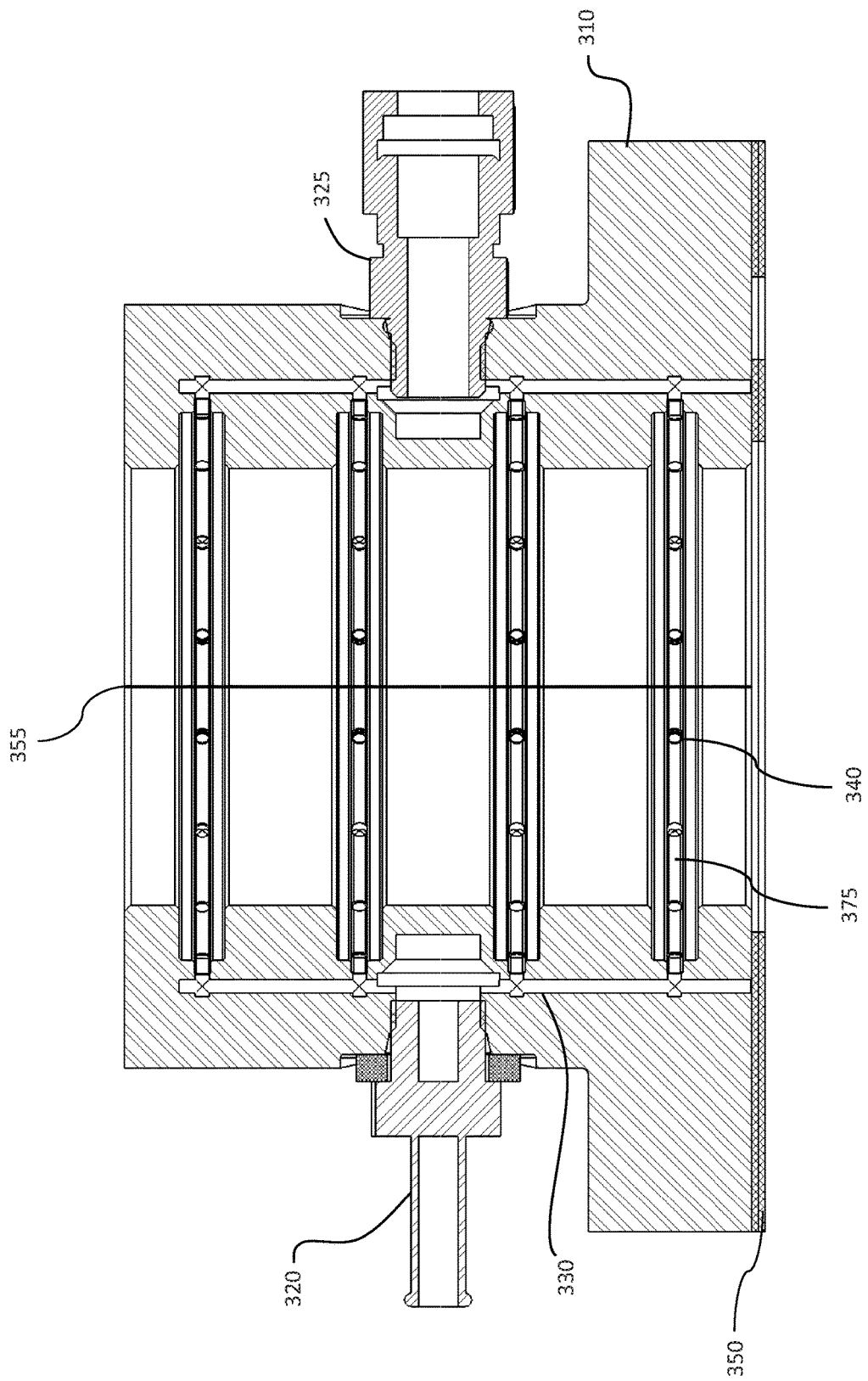
FIG. 4G is a cross section of the electrode seal assembly embodiment of FIG. 4A without the graphite rod or electrode seals present.

In some embodiments depicted in FIGS. 4F through 4G, the cavities, or gas galleries, 330 in the electrode seal assembly 300 may be one of machined or cast. The gas galleries 330 are adjacent to the ring grooves 375 and allow of air or inert gases to be distributed evenly into the seal housing 310 and surround the sealing rings 200. The pressurized air or inert gases press on the external surface 208 (FIG. 3A) of the sealing rings 200 compressing them around the electrode 250.

FIG. 4G depicts a cross section view of the seal housing 310. Each ring groove 375 comprises hole inlets 340 through which the pressurized air and or inert gases may be applied to the sealing rings. These hole inlets 340 allow for pressure to be evenly distributed along the outer surface of each sealing ring 200. The ability to control the pressure in the electrode seal assembly 300 allows for precise electrode feed rate, tighter sealing rings 200, increased system reliability, and ability to incrementally move the electrodes 250 up and down. High pressure allows the sealing rings 200 to tightly lock the electrode 250 in place, if necessary. Pressurization reduces off-gas. In some embodiments, the operational range for the air pressure is 5-10 psi but may rise up to 20-30 psi. The change in pressure may be maintained with the addition of more air or inert gases such that the resulting compression pressure is greater than the pressure in the vitrification containment system during operation.

FIGS. 5A through 5E depict an embodiment of an electrode seal assembly 400. FIGS. 5A through 5E utilize a pressure seal similar to the one depicted and described in FIGS. 4A through 4G.

Figure 5A:
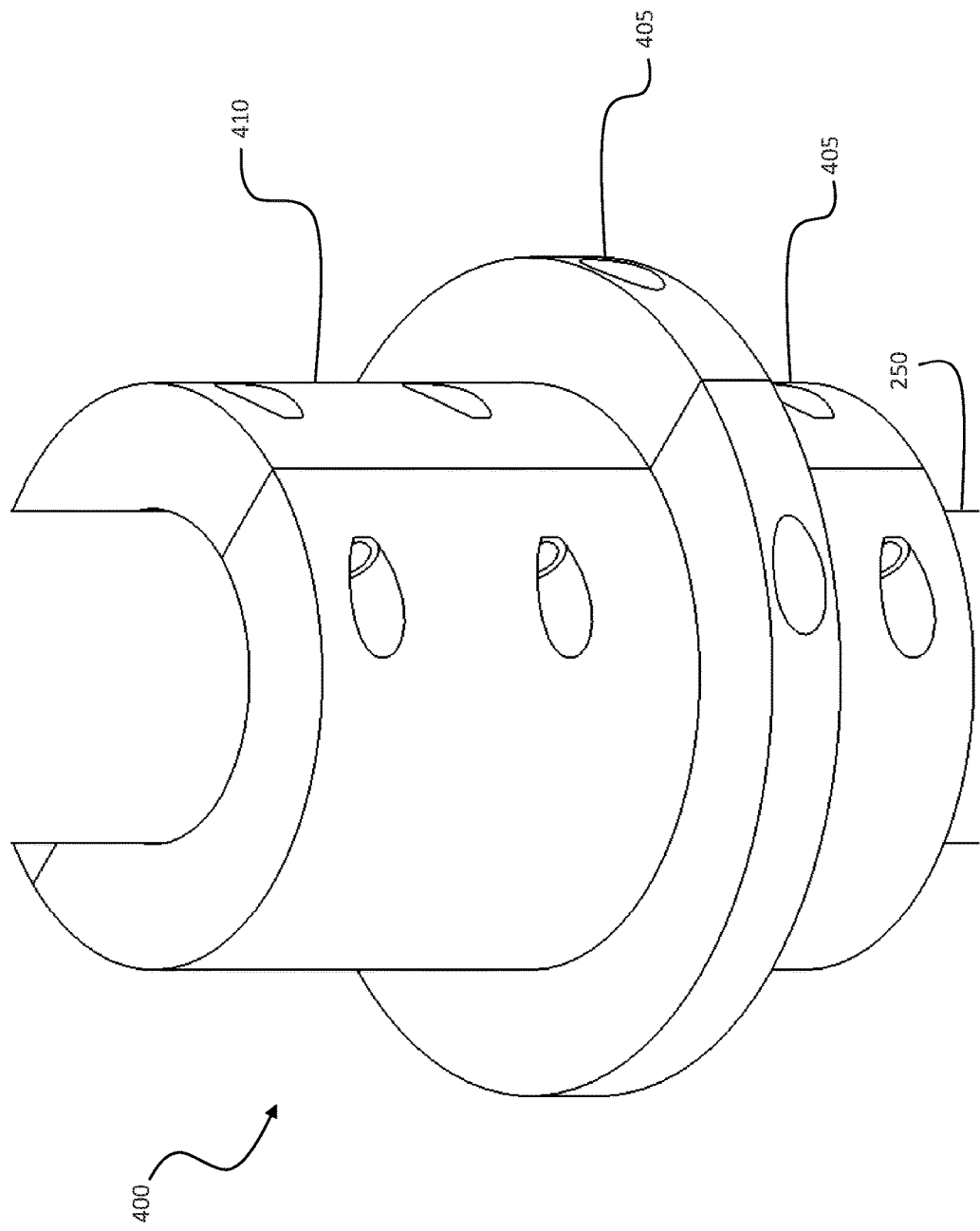
FIG. 5A is an isometric view of an embodiment of an electrode seal assembly.

FIG. 5A depicts an isometric view of the electrode seal assembly 400. In the depicted embodiment, the seal housing 410 is split in half in a clamshell design. In some embodiments the seal housing 410 may comprise more than two portions. In the depicted embodiment, the two halves of the seal housing 410 are fastened together with fasteners through holes 405. The two pieces of the seal housing 410 clamp around the electrode 250 and the sealing rings 200 (FIG. 5B).

FIG. 5B depicts an exploded isometric view of the electrode seal assembly 400. The depicted embodiment comprises the housing seal 410 split into two portions, four sealing rings 200, and fasteners (not depicted). The electrode seal assembly 400 extends into the lid of the vitrification container allowing for a greater overall length of the seal housing 410 which allows for more distance between the sealing rings 200. The extension in length of the seal housing 410 causes more surface area of the electrode 250 to be sealed and provides more electrical insulation between the electrode 250 and the vitrification container. Additionally, greater distance between the sealing rings 200 allows the gap (if present) between electrode 250 segments to pass through the sealing rings 200 while always maintaining at least one engaged sealing ring 200. Some embodiments may use more or fewer sealing rings 200. In some embodiments one or more of the sealing rings 200 may be identical.

FIG. 5C depicts a cross section view of the electrode seal assembly 400. The depicted electrode seal assembly 400 embodiment uses pressurization to reinforce and tighten the sealing rings 200 around the electrode 250. Each sealing ring 200 is mounted in a ring groove 475 (FIG. 5D) to secure it in place. In some embodiments one or more ring groove 475 (FIG. 5D) may be sized to accommodate one or more sealing rings 200. Pressurization may be achieved by inputting air and/or inert gases into the seal housing 410. The pressure may be supplied into the seal housing 410 through a hose fitting and passed through the cavities or gas galleries 430 in each of the seal housing sections 410 to the sealing rings 200. The cavities, or gas galleries, 430 in the electrode seal assembly 400 may be one of machined or cast. The vertical gas galleries 430 are connected to the ring grooves through holes 420 (FIG. 5D) and allow air or inert gases to flow into the seal housing 410 and surround the sealing rings 200. The pressurized air or inert gases press on the external surface of the seals compressing them around the electrode 250.

Figure 5D:
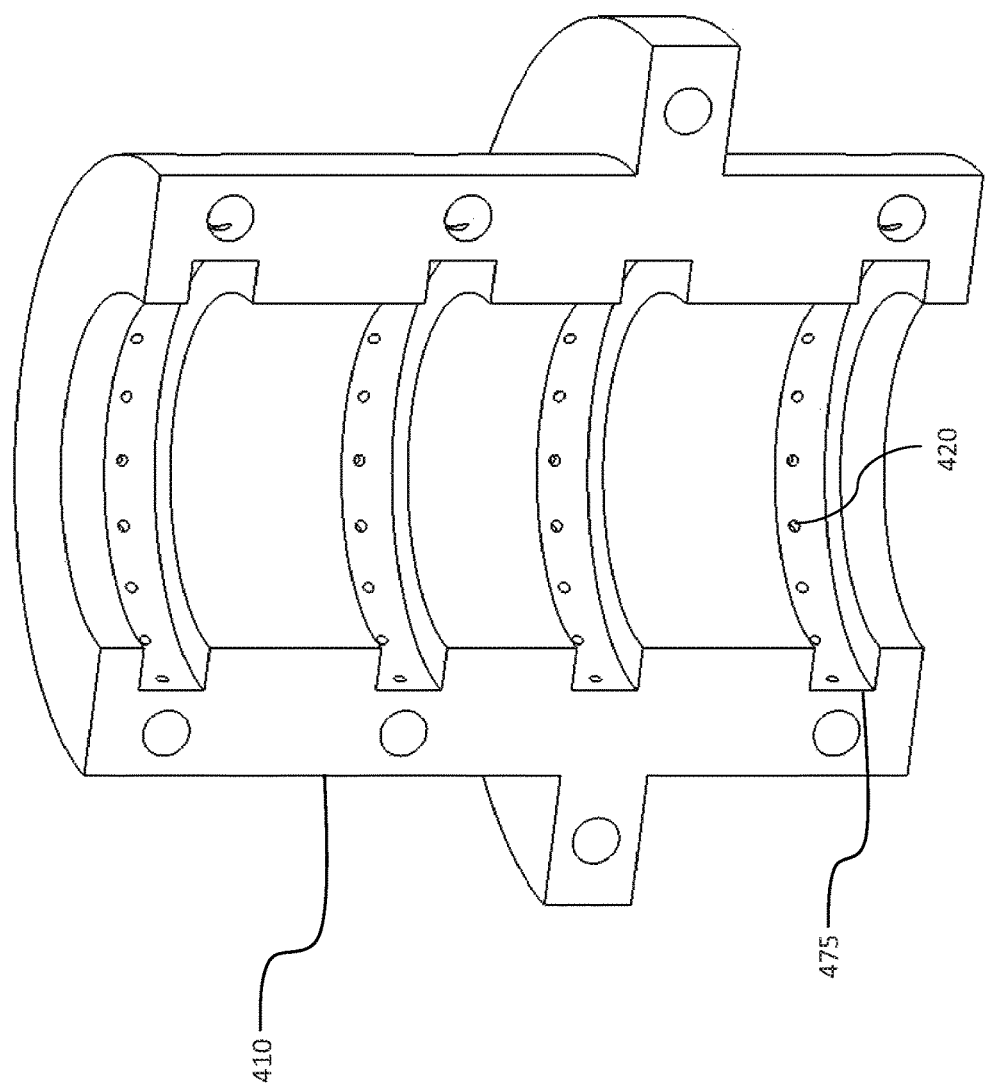
FIG. 5D depicts an isometric view of a clamshell style seal housing of the electrode seal assembly embodiment of FIG. 5A.

FIG. 5D depicts how air pressure is supplied through holes 420 in the ring grooves 475 in the seal housing 410. Each ring groove 475 comprises holes 440 through which the pressurized air and or inert gases may enter and exit the electrode seal assembly 400. The ability to control the pressure in the electrode seal assembly 400 allows for more precise electrode feed rate, tighter sealing rings 200, and increased system reliability. Higher pressure allows the sealing rings 200 to tightly lock the electrode in place, if necessary. Pressurization reduces off-gas. The operational range for the air pressure is 5-10 psi but may rise up to 20-30 psi. The change in pressure may be maintained with the addition of more air or inert gases such that the resulting compression pressure is greater than the pressure in the vitrification containment system during operation.

FIG. 5E depicts a bottom view of the electrode seal assembly 400 showing the vertical gas galleries 430. In the depicted embodiment there are twenty-two vertical gas galleries. Other embodiments may comprise different amounts of vertical gas galleries 430. In some embodiments, such as the depicted embodiment, the vertical gas galleries 430 are evenly distributed.

Figure 6A:
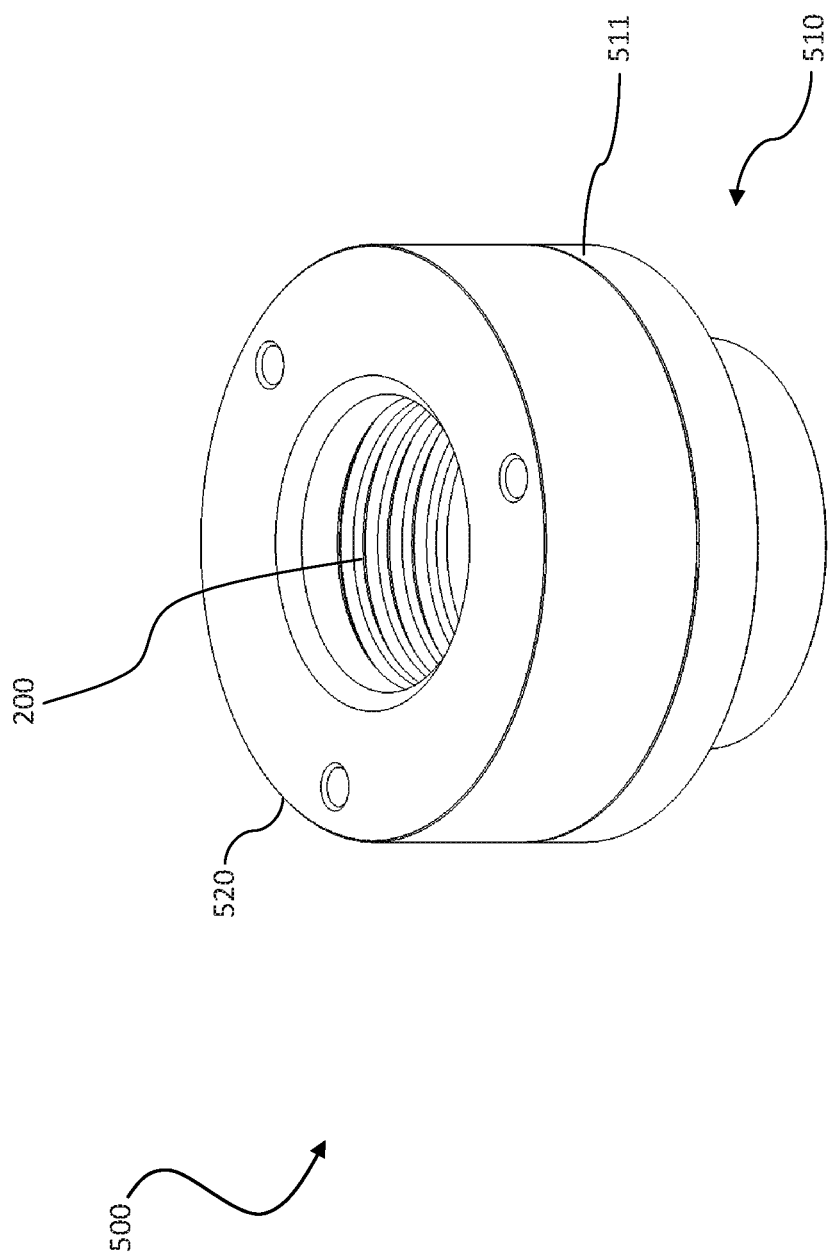
FIG. 6A is an isometric view of an embodiment of an electrode seal assembly.
Figure 6B:
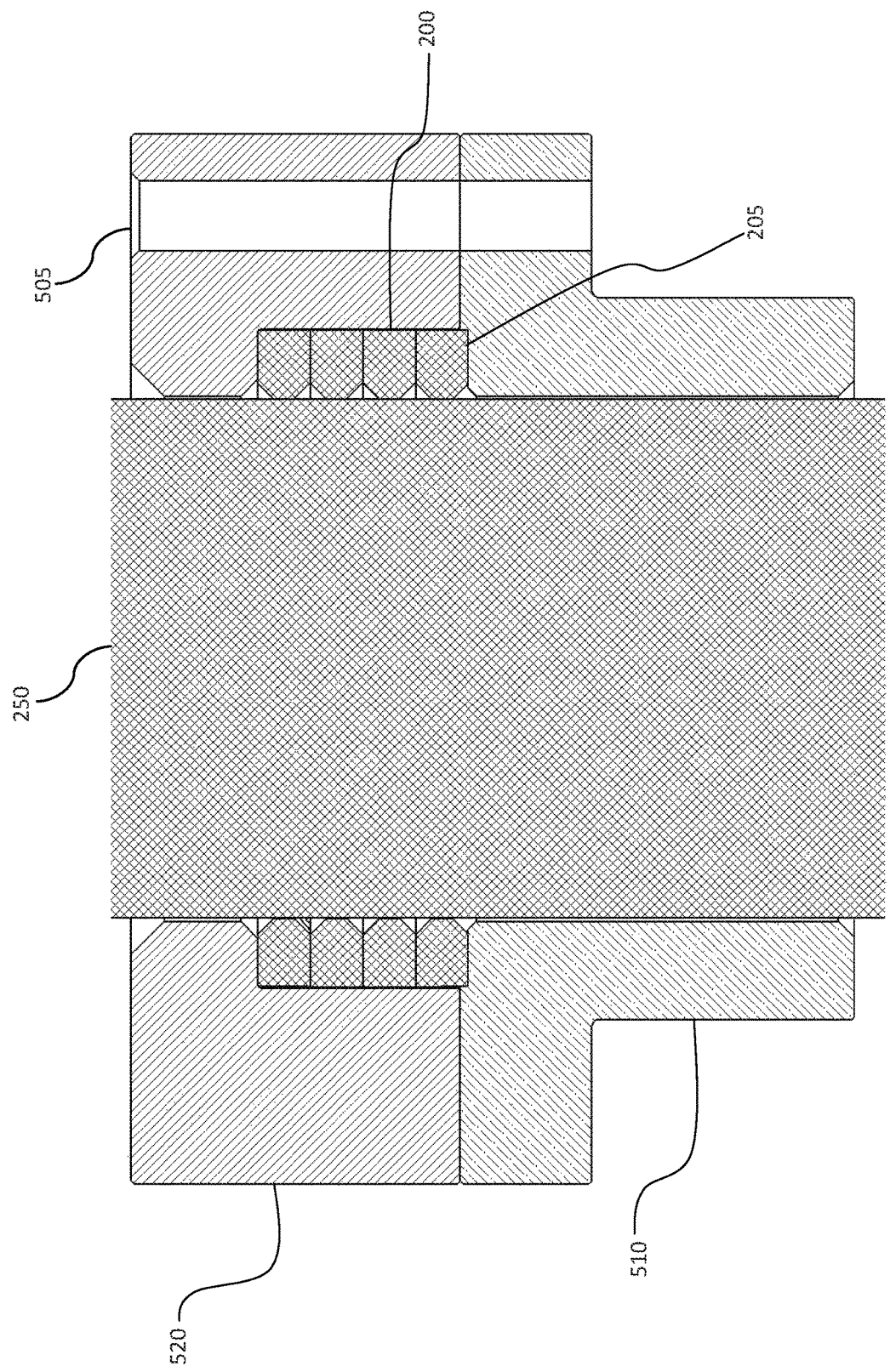
FIG. 6B is a cross section of the electrode seal assembly embodiment of FIG. 6A.
Figure 7B:
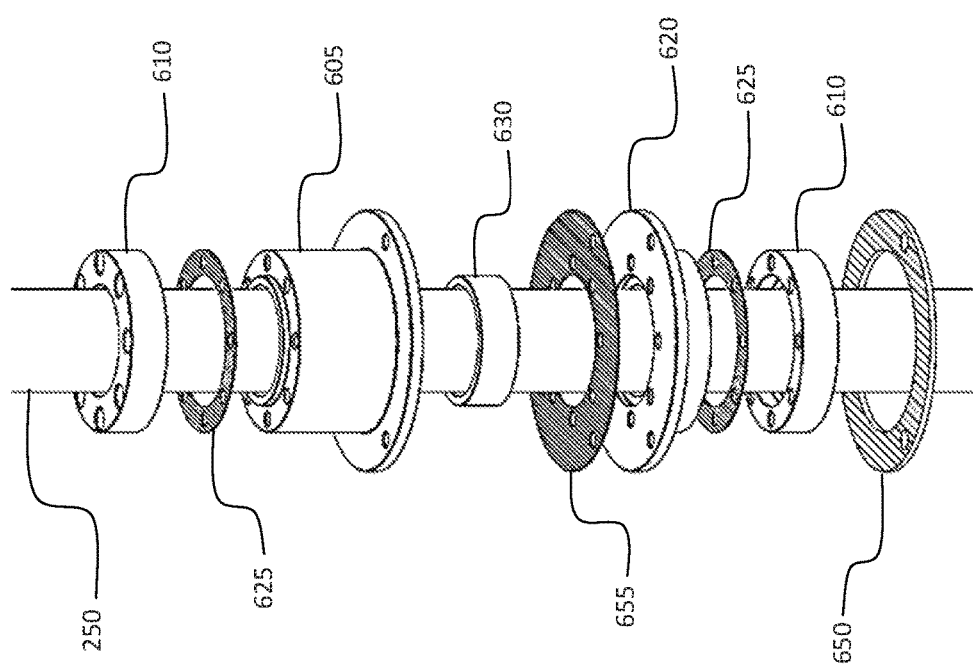
FIG. 7B is an exploded view of the electrode seal assembly embodiment of FIG. 7A.
Figure 7C:
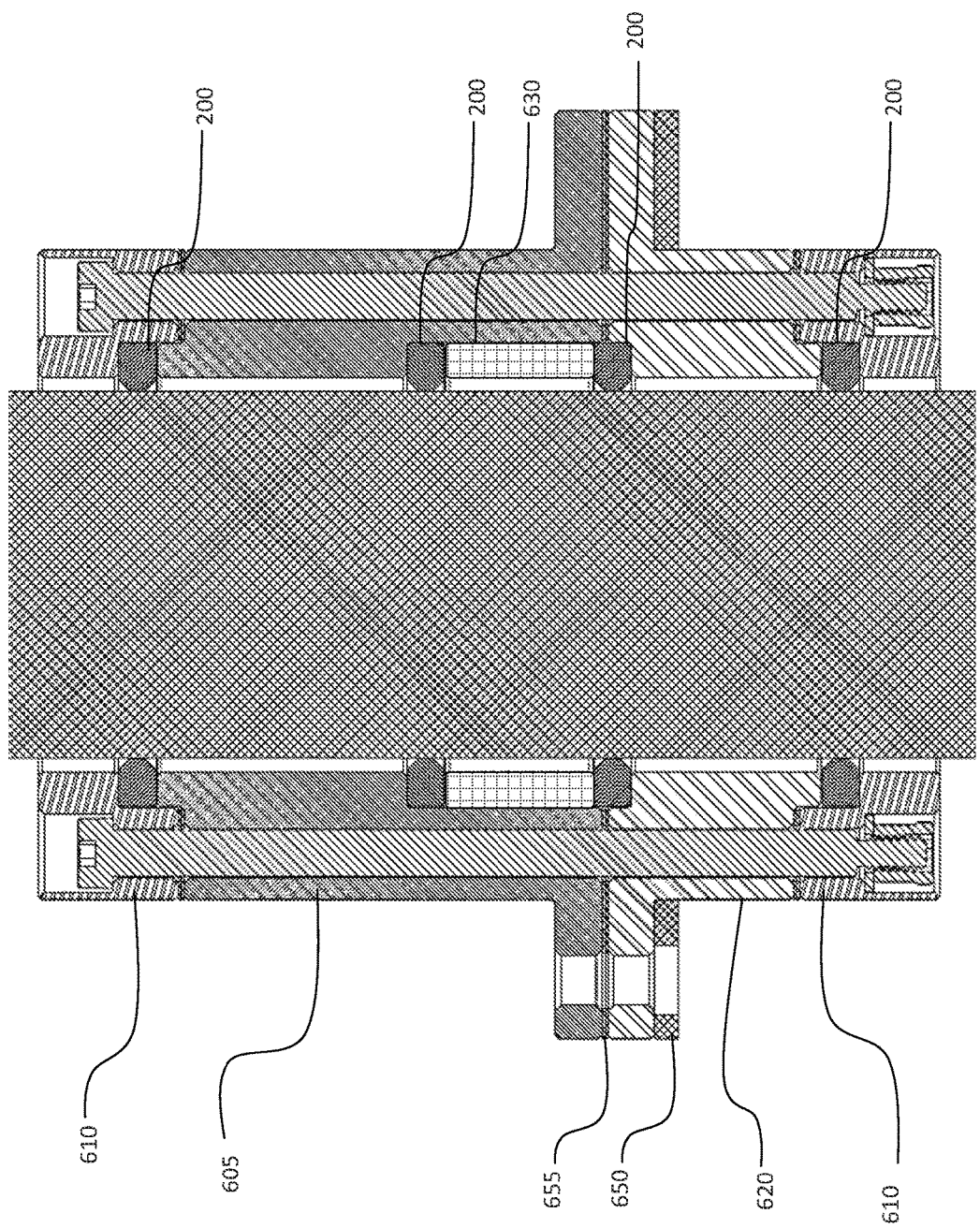
FIG. 7C is a front facing cross section of the electrode seal assembly embodiment of FIG. 7A.

FIGS. 6A and 6B depict an embodiment of an electrode seal assembly 500.

FIG. 6A depicts an embodiment of an electrode seal assembly 500 comprising top seal housing 520, electrode collar 510, and one or more sealing rings 200. The electrode collar 510 fits over the electrode 250 (FIG. 6B) and is partially inserted into the top of the vitrification container. The electrode collar 510 comprises a flange 511 which rests on the top of the vitrification container. Next, graphite sealing rings 200 fit over the electrode 250 and rest on top of the electrode collar 510. The top seal housing 520 then fits over the sealing rings 200 to complete the electrode seal assembly 500. The electrode seal assembly 500 may be fastened together and/or to the top of the vitrification container.

FIG. 6B depicts a cross sectional view of the electrode seal assembly 500. One or more fastener holes 505 may be used to fasten the top seal housing 520 to the electrode collar 510 and to fasten the electrode seal assembly 500 to the top of the vitrification container. The depicted embodiment comprises four sealing rings 200. In some embodiments, such as the depicted embodiment, the inner sealing rings 200 may be plain graphite sealing rings and the outer sealing rings 205 may be Inconel wrapped graphite sealing rings 200. In some embodiments the Inconel is spiral wrapped. This embodiment has been tested and confirmed that a good vacuum is maintained.

FIGS. 7A through 7D depict an embodiment of an electrode seal assembly 600.

Referring to FIGS. 7A through 7D and starting from the base, a housing seal 650 may be placed between the vitrification container lid and the bottom of the electrode seal assembly 600. The bottom seal housing 620 is flanged, with the flange resting atop the housing seal 650 and the rest of the bottom seal housing 620 is inserted into the top of the vitrification container. A bolt hub 610 may connect to the bottom of the bottom seal housing 620, with a bolt hub gasket 625 in between in some embodiments, to fasten the electrode seal assembly 600 together. A first sealing ring 200 is held in place by the bolt hub 610 against the bottom of the bottom seal housing 620. A second sealing ring 200 fits into a groove in the top of the bottom seal housing 620. A ring 630 fits between the second sealing ring 200 and a third sealing ring 200. The top seal housing 605 fits over the second and third sealing rings 200 and the ring 630.

One or more housing gaskets 655 may be placed between the top of the bottom seal housing 620 and the top seal housing 605. The depicted embodiment comprises three housing gaskets. The outer two housing gaskets 653 may be composed graphite. The center housing gasket 655 may be composed of metal, such as stainless steel, sandwiched between layers of graphite in some embodiments. The number and composition of housing gaskets 655 may vary in different embodiments. A fourth sealing ring 200 fits on top of the top seal housing 605 and is held in position by a bolt hub 610. A bolt hub gasket 625 may be placed between the bolt hub 610 and the top seal housing 605. Fasteners, such as bolts, may extend through the electrode seal assembly 600 to fasten the components together. In some embodiments, one or more of the top seal housing 605, bottom seal housing 620, bolt hubs 610, and ring 630 may be comprised of ceramic material or other materials.

Process and Control

FIGS. 8A through 8F depict an embodiment of a Vitrification (FIG. 8A) and Off-Gas Treatment (FIGS. 8B-8F) control system. In the figures long bold dash lines (FIG. 8A) indicate frit feed, double lines (FIGS. 8A and 8B) indicate air, bold lines (FIGS. 8A-8B and 8D-8F) indicate off-gas, medium lines with small arrowheads (FIGS. 8B-8D) indicate water including scrub water (FIGS. 8A-8B), short dashed lines (FIG. 8C) indicate glycol, dotted lines (FIG. 8D) indicate pH adjustment chemicals, and thick dashed lines (FIGS. 8A-8E) indicate electrical and or control signals.

Figure 8A:
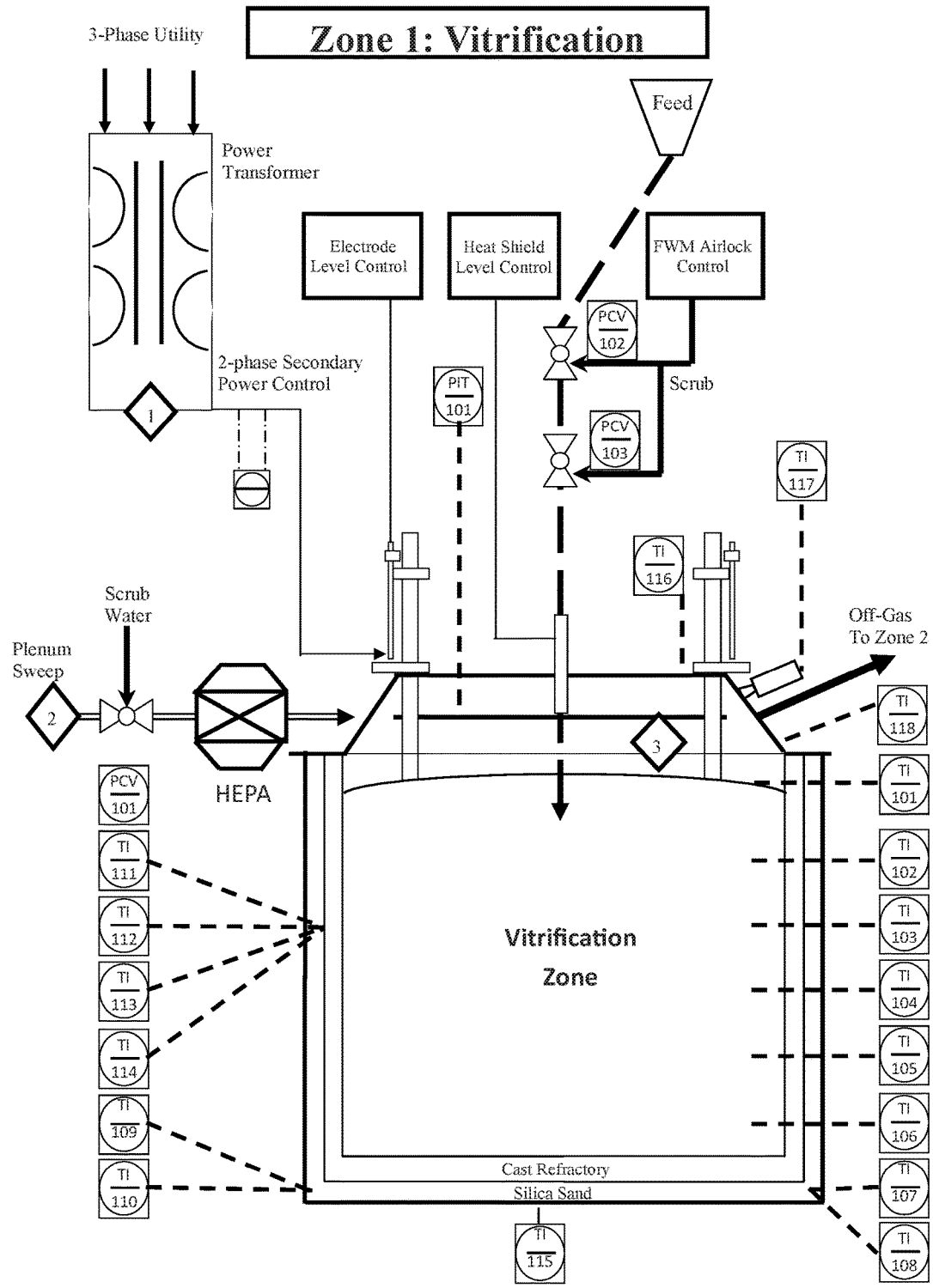
FIG. 8A depicts an embodiment of the vitrification zone in the vitrification and off-gas treatment process embodiment of FIG. 1.

FIG. 8A depicts an embodiment of a vitrification system (Zone 1). The vitrification container may comprise one or more layers of insulating materials. The depicted embodiment comprises cast refractory and silica sand. Frit, which may comprise glass formers in some embodiments, may be fed into the top of the vitrification container through one or more pressure control valves. In the depicted embodiment two pressure control valves PCV-102 and PCV-103 have feed while melt (FWM) airlock controls. The FWM airlock controls allow additional materials to be fed into the vitrification container as the preloaded material volume is reduced during the vitrification process. The airlock provides an air seal into the plenum area such that there is no open route for plenum air to leak into the environment. The feed point is connected to a heat shield and heat shield level control. The electrodes may be fed into the vitrification container through electrode level controls and electrode seal assemblies.

The depicted process embodiment is powered by a three phase utility input into a power transformer (a Scott-T power transformer in the depicted embodiment). The power transformer may allow minimal operator interface to accomplish the purpose of initiating and providing the heating mechanism for a vitrification process. Output out of the power transformer may initially be controlled by an operator input program to gradually increase power to the Vitrification Zone in the vitrification container.

Currently, the vitrification process is controlled manually. The ability to control the process with little to no manual input could increase process efficiency and reduce necessary processing time as well as remove possibility of human error. Programmed inputs may be utilized to initially control the power ramp up to initiate the melting process. A software program may be linked to the existing process control system to gradually increase the power output of the transformer on a predefined schedule (timeline) up to a nominal operating level. The continued operation of the system beyond that point may then use logic based on input from temperature, pressure, visual (e.g. infrared) and or other sensory inputs to adjust the power input to the desired level to safely and efficiently operate the process. Power control may run in parallel with other system control logic that manages off-gas flow, hood vacuum, differential pressures, and other variables throughout the system. The control system may be utilized for both sub-surface Planar™ (in-situ approach) and in container vitrification, ICV™, technologies as well as other vitrification systems and methods.

In Zone 1, plenum sweep air is introduced through line 2 through a pressure control valve PCV-101 and further through a filter (HEPA in the depicted embodiment). The plenum sweep air is used to remove water vapor and gases generated during vitrification from the off-gas hood and route them into off-gas treatment system for treatment before releasing the treated off-gas to the environment. In some embodiments, the removed contaminants may be processed and or stored separately.

Figure 8B:
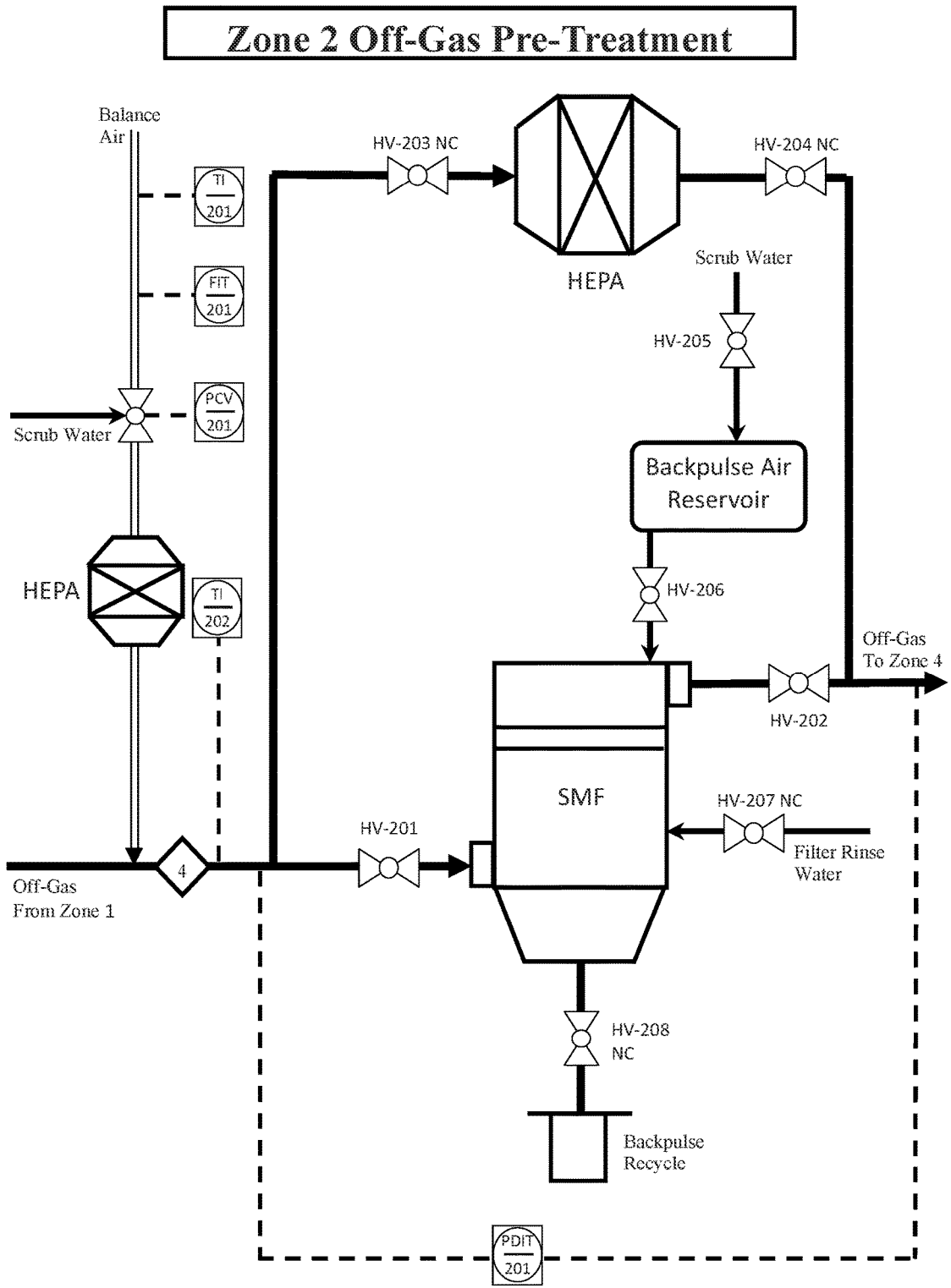
FIG. 8B depicts an embodiment of the off-gas pretreatment zone in the vitrification and off-gas treatment process embodiment of FIG. 1.

With reference to FIG. 8B, the off-gas enters Zone 2 through line 4. It may be joined by balance air which is introduced through a pressure control valve PCV-201 and further through a filter (HEPA in the depicted embodiment). The off-gas (mixed with balance air in some embodiments) then may proceed through at least one filter. In some embodiments two or more filters are in parallel. In some embodiments having parallel filters, flow travels through more than one filter at a time. In some embodiments having parallel filters, flow only travels through one filter at a time and is controlled by valves.

In the depicted embodiment, the flow may travel through valve HV-201 into a sintered metal filter (SMF) and out through valve HV-202. Alternatively, flow may be directed through valve HV-203 into a HEPA filter and out through valve HV-204. From either valve HV-202 and or valve HV-204 flow travels into Zone 4. A water (or other cleaning fluid) rinse may be provided through valve HV-207 to periodically rinse captured contaminants from the SMF filter.

Air, or fluids, may be introduced through valve HV-205 into a backpulse air reservoir through valve HV-206 into the SMF. The backpulse air may flow out of the SMF through valve HV-208 to backpulse air recycle. The backpulse air is used to clean the SMF. The backpulse air quickly blows backwards into the SMF to knock particulate off of the filter which allows it to drop to the bottom of the filter housing where it is collected and can be fed back into the vitrification container for processing. In some embodiments, the filter housing may comprise more than one filter wherein each filter is backpulsed at different times with small individual pulses so as not to pressurize the off-gas system with a single large backpulse.

Figure 8C:
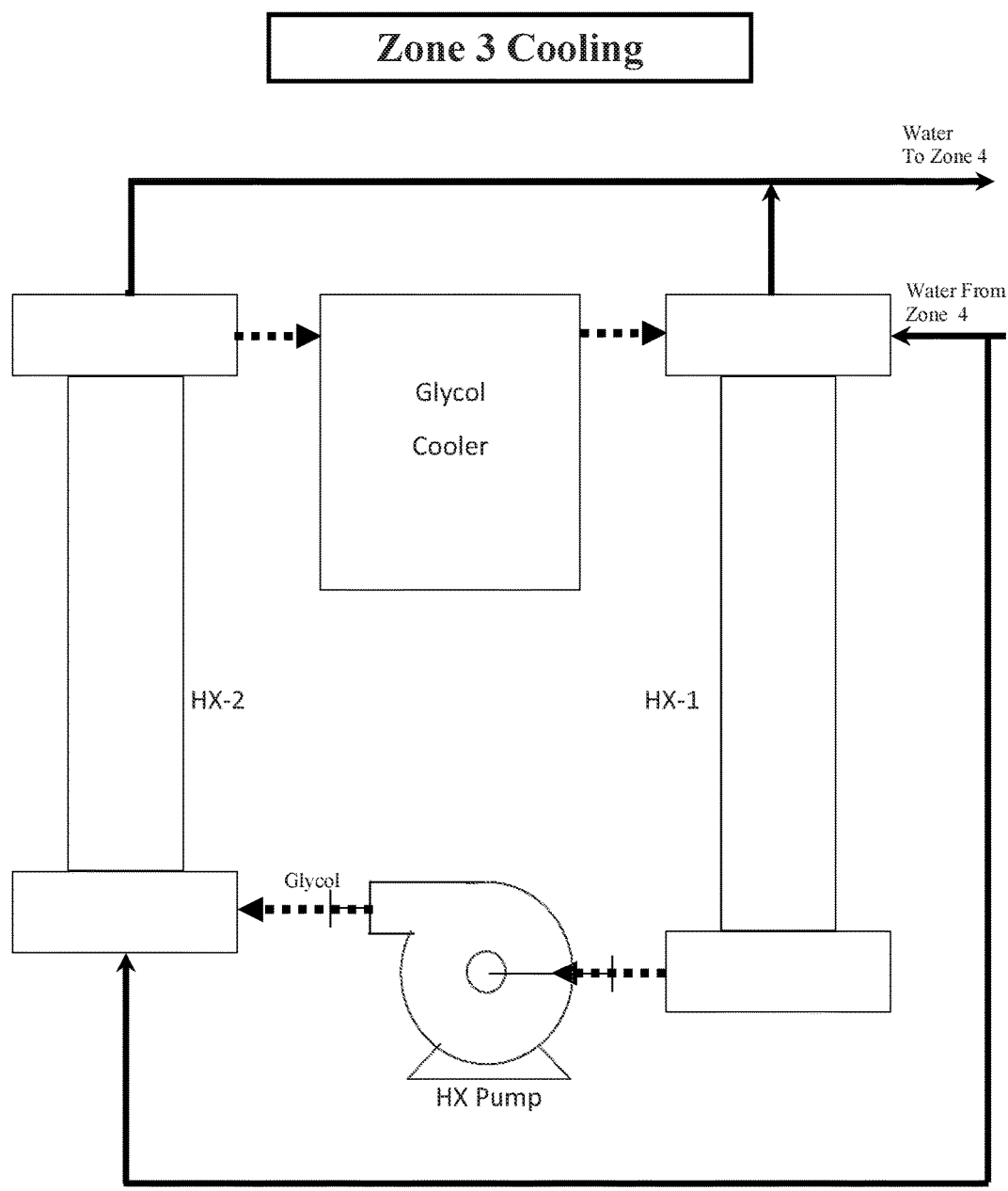
FIG. 8C depicts an embodiment of the cooling zone in the vitrification and off-gas treatment process embodiment of FIG. 1.
Figure 8D:
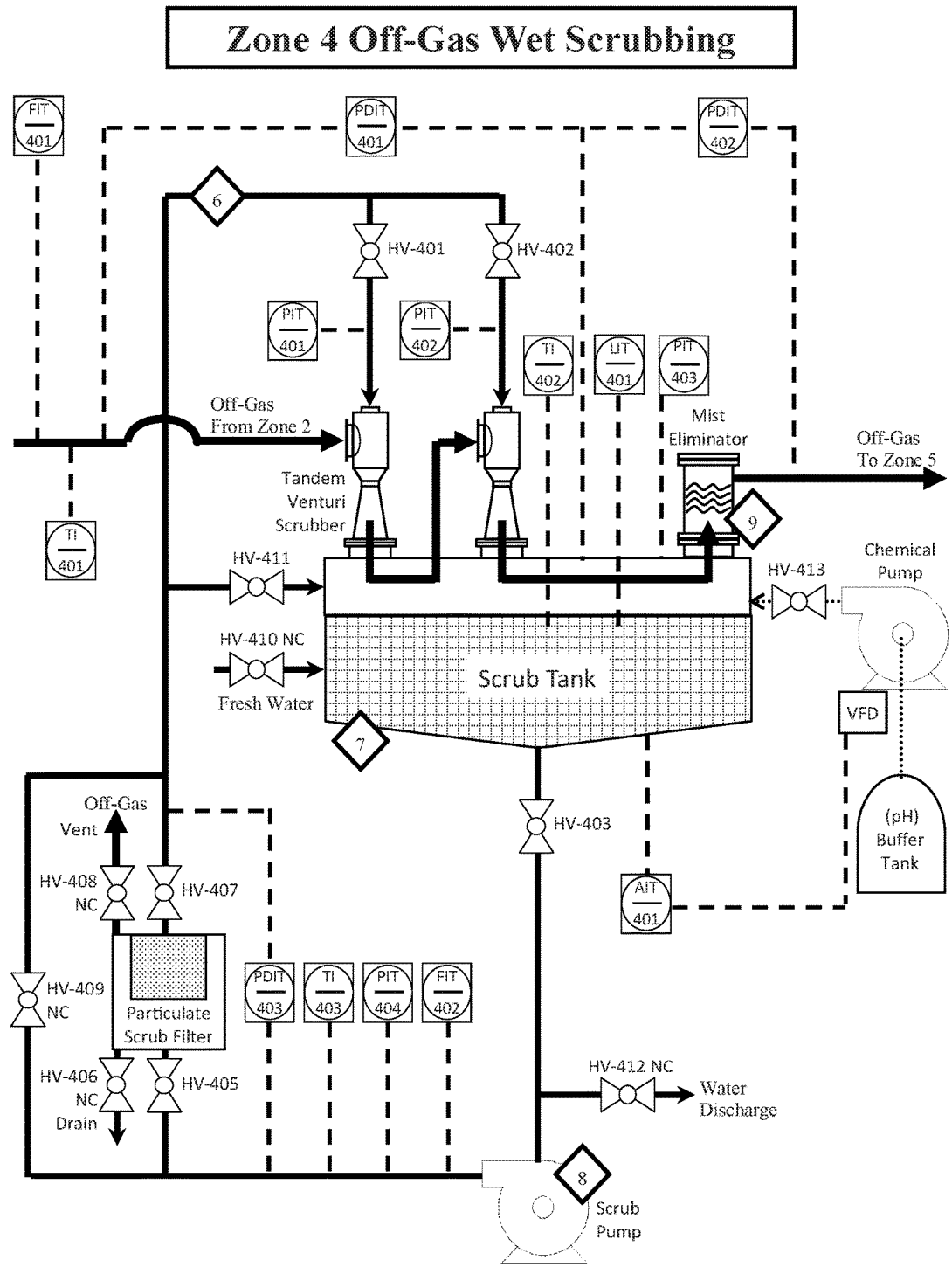
FIG. 8D depicts an embodiment of the off-gas wet scrubbing zone in the vitrification and off-gas treatment process embodiment of FIG. 1.

Some embodiments may include an optional Zone 3, depicted in FIG. 8C, for cooling the water in Zone 4 (FIG. 8D). In other embodiments Zone 3 is not optional and is a requirement. Glycol travels in a circuit through a glycol cooler to a first heat exchanger (HX-1), from the bottom of HX-1 through a pump, into the base of a second heat exchanger (HX-2), and back to the glycol cooler. Water flows through heat exchangers HX-1 and HX-2 and back to Zone 4 (FIG. 8D).

Figure 8E:
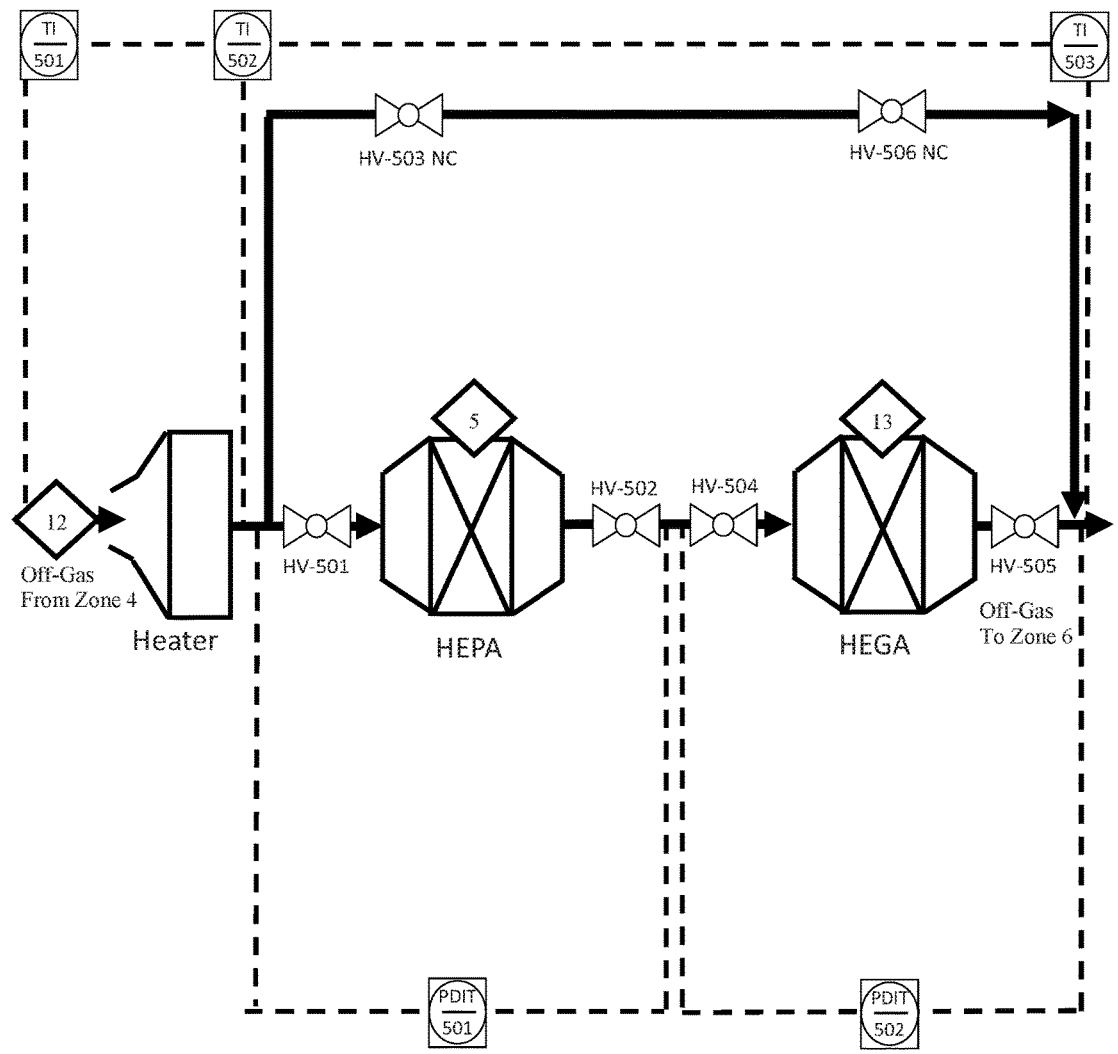
FIG. 8E depicts an embodiment of the off-gas final conditioning zone in the vitrification and off-gas treatment process embodiment of FIG. 1.

In the depicted embodiment the off-gas travels from Zone 2 into tandem Venturi scrubbers and through a mist eliminator into Zone 5 as shown in FIG. 8E. Other embodiments may utilize different scrub systems including dry scrubbers, electrostatic precipitators, and the like. The tandem Venturi scrubbers are situated in proximity to a scrub tank. Fresh water may be fed into the scrub tank through valve HV-410. Water exits the scrub tank and goes through valve HV-403 to a scrub pump. Optionally, water may be discharged from valve HV-412. The scrub pump pumps the water through valve HV-404 and HV-405 into particulate scrub filter. Alternatively, the flow may bypass the particulate scrub filter through valve HV-409. Water may drain from the particulate scrub filter through valve HV-406. Off-gas may vent from the particulate scrub filter through valve HV-408. The water exiting the particulate scrub filter through valve HV-407 and travels through valves HV-401 and HV-402 into tandem Venturi scrubbers. In some embodiments the water may also travel through valve HV-411 into the scrub tank. In some embodiments, the pH of the water in the scrub tank is adjusted with a pH adjusting chemical that is fed from a chemical (pH) buffer tank through chemical pump and through valve HV-413.

Figure 8F:
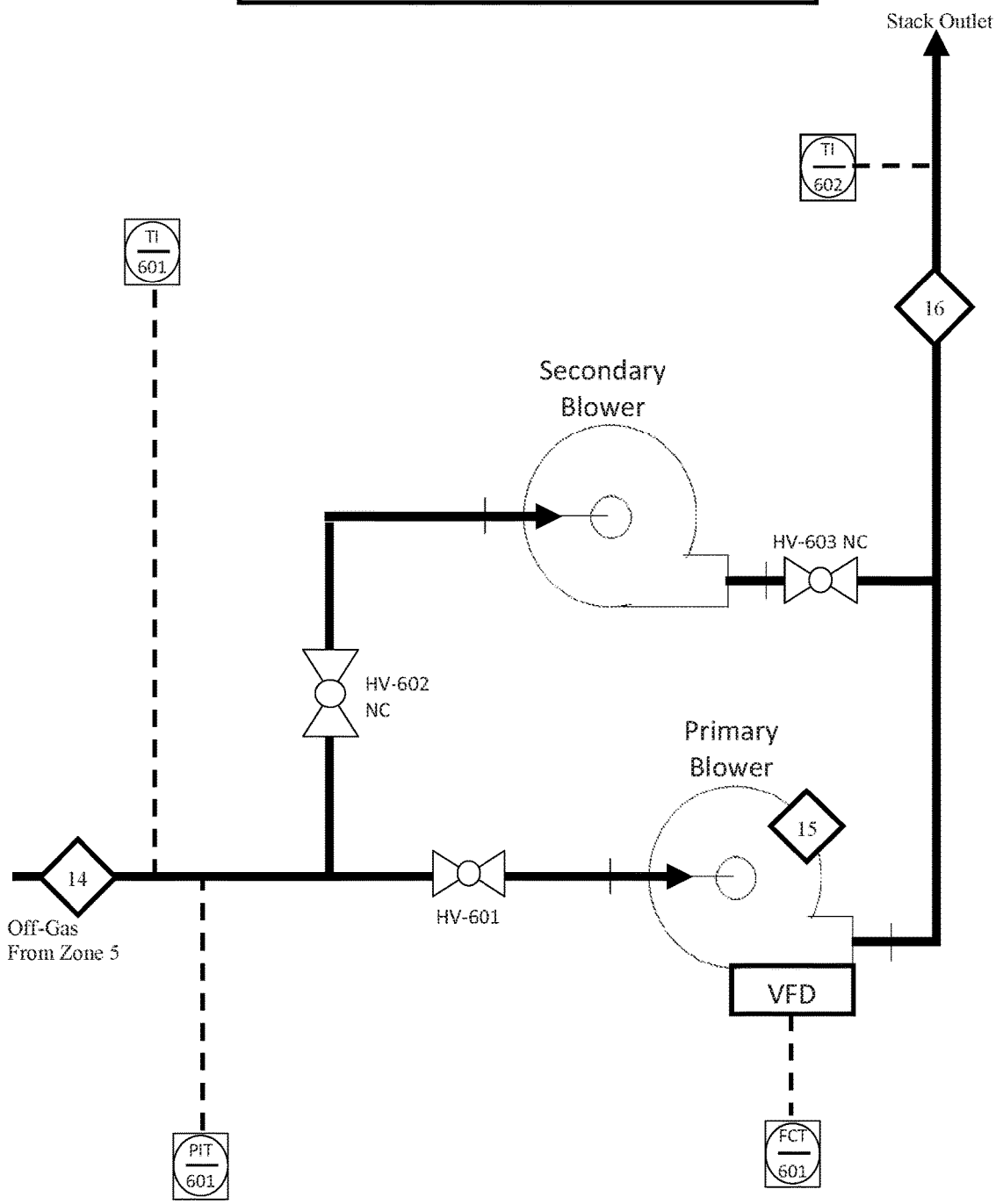
FIG. 8F depicts an embodiment of the off-gas discharge zone in the vitrification and off-gas treatment process embodiment of FIG. 1.

The scrubbed and filtered off-gas from Zone 4 (FIG. 8D) may travel through a heater and through one or more filters in series. In the depicted embodiment the heated off-gas travels through valve HV-501 into a first filter through valves HV-502 and HV-504 through another filter and valve HV-505 to Zone 6 (FIG. 8F). Alternatively, one or more of the filters may be bypassed by passing the off-gas through valves HV-503 and or HV-506. In some embodiments one or more filters may be situated in parallel where they may be used in conjunction with the primary filters or as an alternative to the primary filters.

The off-gas from Zone 5 travels through valve HV-601 through primary blower and is discharged from a stack outlet. Alternatively, the off-gas may flow through valve HV-602 into secondary blower and through valve HV-603 to be discharged through the stack outlet.

Other Process Embodiments

Various filter types are contemplated including, but not limited to, HEPA, SMF, and HEGA. Various valve types are contemplated. Valves may vary from the depicted process diagrams for differing flow rates and volumes and other design considerations. Additional valves, such as check valves, may be positioned throughout the system to prevent fluids from traveling in the wrong direction. Other valves, including automatic motor operated valves or redundant valves, may be included a various points in the process to provide increased factor of safety.

Sensors

One or more sensors and instruments may be used to monitor and control system properties throughout the process. In the embodiment of FIGS. 8A-8F, several instruments and/or sensors are included in each zone. Other embodiments may include more or fewer sensors and/or instruments in other positions throughout the system. The positions and types of sensors and/or instruments may be dependent upon the scale of the process as well as the chemical properties of the off-gas, among other design considerations. Types of sensors may comprise one or more of contact sensors, non-contact sensors, capacitive sensors, inductive sensors, 3D imagers, cameras, thermal imagers, thermometers, pressure sensors, radiation detectors, LIDAR, microphones, among others.

Some embodiments may comprise one or more imaging sensors. The one or more imaging sensors may comprise one or more of 3D imaging, 2D range sensor, camera, thermal imager, and radiation detector, among others. One or more imaging sensors may be used to provide inspection and monitoring capabilities for remote operators. Signals from one or more imaging sensors may be displayed in real-time, recorded for later review, and/or recorded for operational records. Any one or more of the cameras may be one of fixed or pan-tilt-zoom types. An operator may select and manage desired camera views for operations, while controlling the cameras with associated control features such as the pan, tilt, zoom (PTZ), focus, and lights. In an embodiment, proper visual coverage of operations may be made possible by a camera system through adequate camera coverage, determined by camera quantity and location.

In some embodiments sensors are added merely for tracking of the properties of the materials throughout the process. In some embodiments sensor data is used to control the operation of the system. Some embodiments may utilize sensor fusion algorithms to analyze data retrieved from one or more sensors of one or more different types. In some embodiments, the sensor data will automatically be analyzed and automatically effect changes in the control system for the process requiring little to no input from a human operator. In some embodiments, the sensor data and or analysis is displayed for a human operator to perform manual adjustments.

In the depicted embodiment, Zone 1 (FIG. 8A) comprises nineteen instruments. In the depicted embodiment, fifteen temperature indicators are used to monitor the temperature of the vitrification container: TI-101 through TI-106 monitor incremental depths of the material in the vitrification container, TI-107 monitors the northeast (NE) corner sand, TI-108 monitors the southeast (SE) corner sand, TI-109 monitors the southwest (SW) corner sand, TI-110 monitors the northwest (NW) corner sand, TI-111 monitors the inner sand, TI-112 monitors the middle sand, TI-113 monitors the outer sand, TI-114 monitors the outer skin, and TI-115 monitors the bottom skin. Additional temperature indicators may be used to monitor the temperature at other various locations. In the depicted embodiment, further temperature indicating transmitters TI-116, TI-117, and TI-118 are used to monitor temperature at the electrode seal, the infrared (IR) video camera, and in the top of the vitrification container, respectively. A pressure indicating transmitter may be used to monitor the pressure within the vitrification container.

In the depicted embodiment, Zone 2 (FIG. 8B) comprises five instruments. A pressure differential indicating transmitter, PDIT-201, is used to determine and transmit the pressure differential before and after the SMF and or HEPA filter. Flow indicating transmitter FIT-201 and temperature indicator TI-201 are used to monitor the balance air input. The temperature of the off-gas is monitored by temperature indicator TI-202 just before the filters and just after the balance air is added.

In the depicted embodiment, Zone 4 (FIG. 8D) comprises fourteen instruments. A flow indicating transmitter FIT-401 and a temperature indicator TI-401 are used to monitor the properties of the off-gas entering Zone 4. Pressure differential indicating transmitters PDIT-401 and PDIT-402 are used to monitor the differential pressure of the off-gas just before and after the tandem venture scrubbers and just before and after the mist eliminator, respectively. Pressure indicating transmitters PIT-401 and PIT-402 monitor the pressure of the water just before the first and second tandem Venturi scrubbers, respectively. Temperature indicator TI-402, level indicating transmitter LIT-401, and pressure indicating transmitter PIT-403 are used to monitor the scrub tank. Temperature indicator TI-403, pressure indicating transmitter PIT-404, and flow indicating transmitter FIT-402 are used to monitor the water downstream of the scrub pump. Pressure differential indicating transmitter PDIT-403 monitors the differential pressure in the water before and after the particulate scrub filter. Analyzer indicating transmitter AIT-401 connects to the scrub tank and variable frequency drive (VFD) at the chemical pump and is used to monitor the pH and feeds the pump to add caustic to the scrub tank.

In the depicted embodiment, Zone 5 (FIG. 8E) comprises five instruments. Pressure differential indicating transmitters PDIT-501 and PDIT-502 are used to monitor the differential pressure before and after a first and second filter, respectively. Temperature indicators TI-501, TI-502, and TI-503 monitor the temperature of the off-gas entering Zone 5, between the heater and the first filter, and after the filters, respectively.

In the depicted embodiment, Zone 6 (FIG. 8F) comprises four instruments. Temperature indicators TI-601 and TI-602 monitor the temperature of the off-gas entering Zone 6 and discharge, respectively. Pressure indicating transmitter PIT-601 monitors the pressure of the off-gas prior to entry to the blower. Flow control transmitter FCT-601 monitors and controls flow generated by the primary blower with variable frequency drive. FCT-601 is connected to the off-gas hood pressure indicating transmitter PIT-101 in Zone 1. As the vacuum in the hood drops the blower is sped up to increase flow and vacuum.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the systems, methods, processes, and/or apparatuses disclosed herein in a preferred embodiment thereof, it should be apparent that the systems, methods, processes, and/or apparatuses may be modified in arrangement and detail without departing from such principles. Claim is made to all modifications and variation coming within the spirit and scope of the following claims.

What is claimed is:

1. A vitrification system, comprising:
   a vitrification container;
   a lid attached to the vitrification container, wherein the attached lid forms a sealed vitrification container;
   two or more electrodes wherein the two or more electrodes are operatively positioned through the lid and extend down into the vitrification container;
   two or more electrode seal assemblies affixed to the lid, wherein the two or more electrode seal assemblies provide insulation for the two or more electrodes and wherein each of the two or more electrode seal assemblies comprises:
   a housing, wherein the housing comprises of two halves;
   two or more ring grooves recessed into the housing such that two or more sealing rings with a split can be placed into the two or more ring grooves, and wherein the placement results in external faces of the two or more sealing rings recessed into the ring grooves;
   one or more gas galleries at least one of machined and cast into the housing such that the gas galleries are adjacent to the two or more ring grooves, wherein the one or more gas galleries distribute gas onto the external faces of the two or more sealing rings from interior faces of the two or more ring grooves, wherein the distributed gas causes a change in pressure resulting in the two or more sealing rings compressing onto the electrodes and forming seals.

2. The vitrification system of claim 1, wherein the electrode seal assemblies each include four ring grooves for receiving four sealing rings.

3. The vitrification system of claim 1, wherein the two or more sealing rings are composed of graphite.

4. The vitrification system of claim 1, wherein one or more of the sealing rings are wrapped or coated with a material that comprises at least one of an oxidation and corrosion resistant material suited for service in extreme environments including at least one of pressure and heat, and wherein the wrapped material when subjected to heat and pressure forms a stable passivating oxide layer protecting a surface of the sealing rings from degradation.

5. The vitrification system of claim 4, wherein at least one of the sealing rings is wrapped with a material that is austenite nickel-chromium based.

6. The vitrification system of claim 1, wherein at least one of the sealing rings is spiral wrapped with Inconel.

7. The vitrification system of claim 1, wherein the sealing rings comprise a chamfer in the interior faces to facilitate movement of the electrodes without damage to the electrodes.

8. The vitrification system of claim 1, wherein the ring grooves are each sized to accommodate one or more of the sealing rings.

9. The vitrification system of claim 1, wherein the change in pressure is maintained with the addition of more gas such that the pressure resulting from the sealing rings compressing onto the electrodes is greater than a pressure in the sealed vitrification container during operation.

10. The vitrification system of claim 1, wherein the insulation provided by the electrode seal assemblies is one of thermal and electrical.

11. A method for vitrification, comprising:
    using a vitrification container;
    using a lid attached to the vitrification container, wherein the attached lid forms a sealed vitrification container;
    using two or more electrodes wherein the two or more electrodes are operatively positioned through the lid and extend down into the vitrification container;
    using two or more electrode seal assemblies affixed to the lid, wherein the two or more electrode seal assemblies provide insulation for the two or more electrodes and wherein each of the two or more electrode seal assemblies comprises:
    a housing, wherein the housing comprises of two halves;
    two or more ring grooves recessed into the housing such that two or more sealing rings with a split can be placed into the two or more ring grooves, and wherein the placement results in external faces of the two or more sealing rings recessed into the ring grooves;
    one or more gas galleries at least one of machined and cast into the housing such that the gas galleries are adjacent to the two or more ring grooves, wherein the one or more gas galleries distribute gas onto the external faces of the two or more sealing rings from interior faces of the two or more ring grooves, wherein the distributed gas causes a change in pressure resulting in the two or more sealing rings compressing onto the electrodes and forming seals.

12. The method for vitrification of claim 11, wherein the electrode seal assemblies each include four ring grooves for receiving four sealing rings.

13. The method for vitrification of claim 11, wherein the two or more sealing rings are composed of graphite.

14. The method for vitrification of claim 11, wherein one or more of the sealing rings are wrapped or coated with a material that comprises at least one of an oxidation and corrosion resistant material suited for service in extreme environments including at least one of pressure and heat, and wherein the wrapped material when subjected to heat and pressure forms a stable passivating oxide layer protecting a surface of the sealing rings from degradation.

15. The method for vitrification of claim 14, wherein at least one of the sealing rings is wrapped with a material that is austenite nickel-chromium based.

16. The method for vitrification of claim 11, wherein at least one of the sealing rings is spiral wrapped with Inconel.

17. The method for vitrification of claim 11, wherein the sealing rings comprise a chamfer in the interior faces to facilitate movement of the electrodes without damage to the electrode.

18. The method for vitrification of claim 11, wherein the ring grooves are each sized to accommodate one or more of the sealing rings.

19. The method for vitrification of claim 11, wherein the change in pressure is maintained with the addition of more gas such that the pressure resulting from the sealing rings compressing onto the electrodes is greater than a pressure in the sealed vitrification container during operation.

20. The method for vitrification of claim 11, wherein the insulation provided by the electrode seal assemblies is one of thermal and electrical.

* * * * *